United States Patent
Sekino et al.

(10) Patent No.: US 7,992,897 B2
(45) Date of Patent: Aug. 9, 2011

(54) AIRBAG DEVICE

(75) Inventors: Tadaaki Sekino, Ibaraki (JP); Kazuhiko Soemoto, Osaka (JP); Keisuke Moritani, Takatsuki (JP)

(73) Assignee: Ashimori Industry Co., Ltd., Osaka (JP)

( * ) Notice: Subject to any disclaimer, the term of this patent is extended or adjusted under 35 U.S.C. 154(b) by 126 days.

(21) Appl. No.: 12/447,150

(22) PCT Filed: Aug. 1, 2007

(86) PCT No.: PCT/JP2007/065084
§ 371 (c)(1), (2), (4) Date: Apr. 24, 2009

(87) PCT Pub. No.: WO2008/050519
PCT Pub. Date: May 2, 2008

(65) Prior Publication Data
US 2010/0001495 A1  Jan. 7, 2010

(30) Foreign Application Priority Data

Oct. 26, 2006 (JP) ................. 2006-291078
Dec. 19, 2006 (JP) ................. 2006-341168

(51) Int. Cl.
*B60R 21/233* (2006.01)
*B60R 21/23* (2006.01)
*B60R 21/239* (2006.01)
(52) U.S. Cl. ...... 280/739; 280/729; 280/740; 280/743.2
(58) Field of Classification Search .............. 280/739, 280/740, 729, 743.1, 743.2
See application file for complete search history.

(56) References Cited

U.S. PATENT DOCUMENTS

| 5,240,283 | A  | * | 8/1993 | Kishi et al. ............. 280/729 |
| 6,059,312 | A  | * | 5/2000 | Staub et al. ............ 280/729 |
| 6,419,267 | B1 | * | 7/2002 | Hashimoto et al. ...... 280/743.1 |
| 7,328,915 | B2 | * | 2/2008 | Smith et al. ........... 280/739 |
| 7,748,738 | B2 | * | 7/2010 | Schneider ............. 280/740 |
| 2002/0005638 | A1 | * | 1/2002 | Musiol et al. .......... 280/743.1 |
| 2003/0030254 | A1 | * | 2/2003 | Hasebe ............... 280/729 |
| 2003/0034637 | A1 |  | 2/2003 | Wang et al. |
| 2004/0090054 | A1 | * | 5/2004 | Bossecker et al. ...... 280/739 |

(Continued)

FOREIGN PATENT DOCUMENTS

DE 196 40 322 A1 3/1998
DE 10 2004 058 439 B3 7/2006

(Continued)

*Primary Examiner* — Paul N. Dickson
*Assistant Examiner* — George D. Spisich
(74) *Attorney, Agent, or Firm* — Sughrue Mion, PLLC

(57) ABSTRACT

To enhance an occupant restraining force of an airbag, and to improve a protective function for an occupant of an airbag device by discharging gas without fail regardless of a position of the occupant, an airbag (10) is divided into a first chamber (10A) on an inflator (2) side and a second chamber (10B) on an occupant side by a partition wall (11), and the first chamber (10A) includes an opening (23) to which a discharge-state switching member (30) having vent holes to discharge the gas in the airbag (10) and being switchable between the discharge/non-discharge states is attached. The discharge-state switching member (30) is coupled to the partition wall (11) by a tether belt (40), so that the tether belt (40) applies tension to close the vent holes when the airbag (10) inflates, and when the airbag (10) receives an occupant, releases the tension depending on the position of the receipt, and opens the vent holes.

20 Claims, 12 Drawing Sheets

U.S. PATENT DOCUMENTS

| | | | |
|---|---|---|---|
| 2004/0188990 A1* | 9/2004 | Short et al. | 280/739 |
| 2005/0248137 A1* | 11/2005 | Delventhal et al. | 280/739 |
| 2006/0071461 A1* | 4/2006 | Williams et al. | 280/739 |
| 2006/0197320 A1* | 9/2006 | Abe | 280/729 |
| 2007/0045997 A1* | 3/2007 | Abe et al. | 280/729 |

FOREIGN PATENT DOCUMENTS

| | | |
|---|---|---|
| JP | 04-020857 U | 2/1992 |
| JP | 06-127330 A | 5/1994 |
| JP | 2000-159045 A | 6/2000 |
| JP | 2002-079904 A | 3/2002 |
| JP | 2003-137060 A | 5/2003 |
| JP | 2004-512209 A | 4/2004 |
| JP | 2005-153726 A | 6/2005 |
| JP | 2007-216943 A | 8/2007 |
| WO | 2006-041547 A2 | 4/2006 |

\* cited by examiner

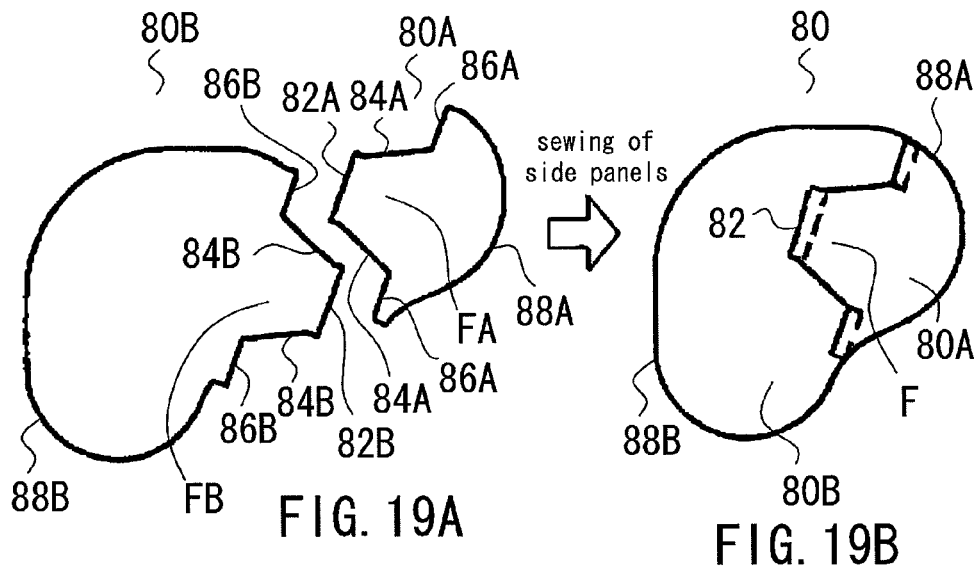
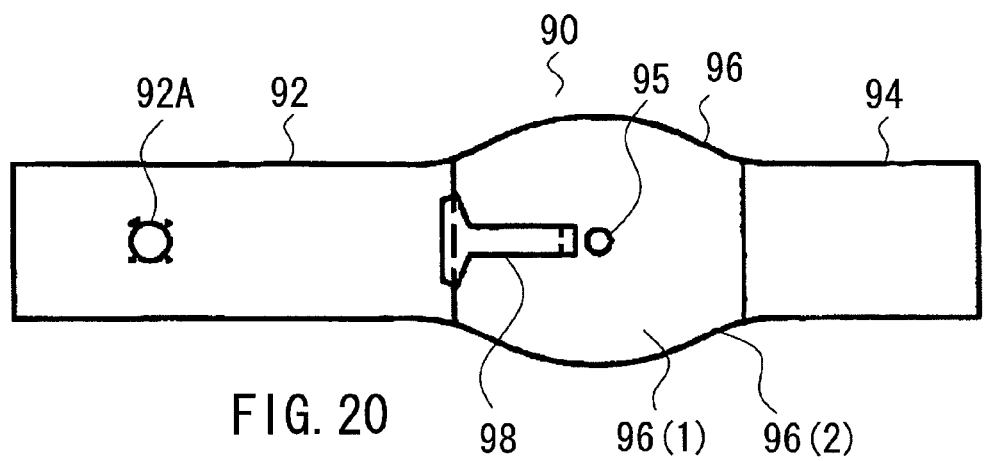
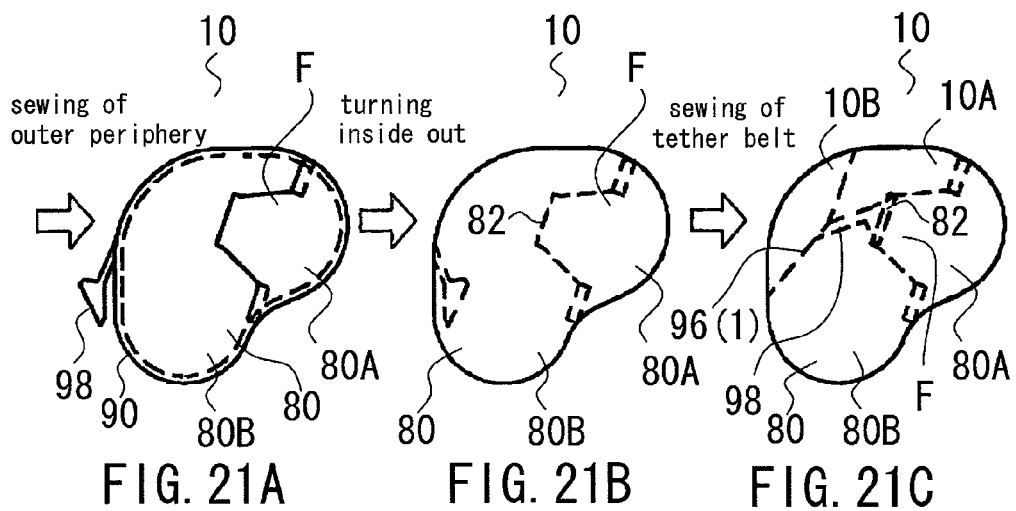

AIRBAG DEVICE

TECHNICAL FIELD

The present invention relates to an airbag device that inflates and protects an occupant in a vehicle collision or the like, more particularly, an airbag device having a switch-vent hole mechanism that divides the inside of an airbag into a plurality of chambers to improve protective function for an occupant.

BACKGROUND ART

In recent years, automobiles provided with an airbag device in a steering wheel or an instrument panel of a vehicle thereof for example have been widely used to protect an occupant in a driver seat or a passenger seat in emergency such as a vehicle collision or in an emergency braking. Upon detection of a vehicle collision, the airbag device causes an inflator to supply gas into an airbag for inflation and deployment, so that the inflated and deployed airbag receives an occupant's head and the like that moves toward the front side of the vehicle, and protects the occupant from the impact of the collision.

Therefore, in such an airbag device, an airbag needs to rapidly inflate and deploy in a vehicle collision or the like to be able to provide adequate restraining force (restraint capability) to an occupant. After the inflated and deployed airbag receives an occupant, the gas in the airbag should be discharged outside to softly accept the occupant therein and adsorb the impact applied to the occupant in the collision. As a result, conventionally, an airbag device has been used in which the inside of the airbag is divided into a plurality of chambers, and vent holes reside in the airbag to meet the above described requires (see Patent Document 1).

FIG. 22 is a perspective view showing a conventional airbag device with an inflated and deployed airbag.

An airbag device 100 includes, as shown, a bag-like airbag 110 that is formed in a generally fan shape as seen laterally, and an inflator (not shown) at a gas inlet port 120 in the lower surface of the airbag 110, and in a vehicle collision or the like, a gas is supplied through the gas inlet port 120 from the inflator to cause the airbag 110 to inflate and deploy toward the position of an occupant (in the right upper direction in the drawing).

The airbag 110 is configured with five surfaces including: an upper surface portion 111 and a lower surface portion 112 that are generally rectangular, a pair of generally fan shaped side surface portions 113 between the portions 111 and 112, and a front portion 114 on an occupant side of the airbag 110 that curves toward outside of the airbag 110. The airbag 110 has an inner space defined by the above portions 111 to 114, and further includes a partition wall 115 that divides the inner space of the airbag 110 into a first chamber 110A on a inflator side and a second chamber 110B on an occupant side, and a coupling belt 116 having a predetermined length for coupling the partition wall 115 to the first chamber 110A side of the airbag 110.

The partition wall 115 has a generally L-shape as seen laterally to define the first chamber 110A having a generally V-shape as seen laterally and the second chamber 110B having a generally fan shape, and also has a plurality of communication holes 121 provided therein for communication between the first chamber 110A and the second chamber 110B for gas flow. Both of the side surfaces 113 on the second chamber 110B side individually have vent holes 122 through which gas in the airbag 110 is discharged, and the gas supplied through the gas inlet port 120 inflates the first chamber 110A of the airbag 110, and passes through the communication holes 121 to inflate the second chamber 110B to cause the entire airbag 110 to inflate and deploy, and is then discharged through the vent holes 122.

The airbag device 100 uses the second chamber 110B inflated and deployed as described above to receive and limit the movement of the head and the like of an occupant who entered the airbag 110 for restraint and protection of the occupant. In the restraint and protection, the airbag device 100 uses the coupling belt 116 to control the outgoing distances and an outgoing pressures of the airbag 110 and the second chamber 110B toward the occupant, which enhances the deployment property and improves the occupant restraining force. After received an occupant, the airbag device 100 causes the gas in the airbag 110 to be discharged through the vent holes 122, so that the impact applied to the occupant in collision can be absorbed to some degree and the protective function is enhanced.

However, in the conventional airbag device 100, the inner pressure of the second chamber 110B is gradually decreased as the gas is discharged through the vent holes 122, which causes the occupant restrained by the second chamber 110B to be likely to move, thereby the restraining force to limit the movement of the occupant by the second chamber 110B and the airbag 110 also tends to be gradually decreased. Thus, such airbag device 100 can hardly deal with the case where a larger restraining force to an occupant is required, and sometimes may not provide an appropriate restraining force, which means the protective function for an occupant needs to be improved. In addition, the airbag device 100 requires a large number of components in manufacturing of the air bag 110, and the partition wall 115 and the coupling belt 116 are arranged at predetermined positions inside of the airbag device 100 to be bonded together, resulting in a relatively complicated configuration and low workability in the manufacturing that involves sewing or the like.

Also, in the airbag device 100, the vent holes 122 on the second chamber 110B toward an occupant may be sandwiched between the occupant and the partition wall 115 for example and the gas discharge through the vent holes 122 may be blocked, depending on where and how the occupant entered the airbag 110 or how much the second chamber 110B had deployed when the occupant hit. In the case, the gas in the airbag 110 is not adequately discharged when the occupant is received in the airbag 110, which causes a problem that the impact absorbing capability is decreased and the impact applied to the occupant in the entrance is increased.

The above described problems are likely to occur particularly in a case where an occupant not seated in a normal position contacts the airbag 110 and the position or the timing of the contact with the airbag 110 is not right, including when an occupant is not wearing a seat belt, or is wearing a seat belt but seated in a position closer to the airbag device 100 than normal, or when an occupant is seated leaning forward from a normal position and is in a position closer to the airbag device 100 than normal. When an occupant is relatively small like a child who is seated in a passenger seat for example, even if the occupant is seated in a normal position, the occupant may contact the airbag 110 at a wrong position, which raises the possibility that the above described problems may occur. The possibility is further raised in a case where such an occupant is in a posture that differs largely from a normal position, including when an occupant is approaching an instrument panel, or an occupant's head or chest is in contact with the instrument panel. Therefore, in order to reduce the impact to an occupant and safely protect the occupant, a gas in the airbag 110 needs to be discharged without fail, so that the impact absorbing capability of the airbag 110 is improved even when an occupant is not in the above described normal upright posture (Out Of Position, hereinafter, referred to as OOP).

[Patent Document 1] Japanese Patent Application Laid-Open No. 2000-159045
[Patent Document 2] WO 2006/041547 A2

DISCLOSURE OF THE INVENTION

Problems to be Solved by the Invention

The present invention was made in view of the problems in the prior art, and one object of the present invention is to provide an airbag device in which an airbag is able to provide an enhanced restraining force to an occupant to further ensure the limitation of movement of the occupant in a collision, and also even when the occupant is in OOP for example, a gas discharge from the airbag is more reliably achieved to reduce the impact to the occupant, so that the protective function of the airbag device to the occupant is improved.

Means for Solving by the Invention

The invention according to claim 1 is an airbag device including an airbag inflatable and deployable by gas and an inflator supplying the gas to the airbag, the improvement including: a partition wall dividing the inside of the airbag into a first chamber on the inflator side and a second chamber on the occupant side and having a gas passage which enables the gas to flow between the first chamber and the second chamber; a discharge-state switching member on the first chamber side of the airbag, the discharge-state switching member having vent holes for discharging the gas in the airbag and capable of switching the vent holes between a discharge state discharging the gas in the airbag and a non-discharge state not discharging the gas in the airbag; a coupling member coupled to the discharge-state switching member at one end thereof and to the partition wall at the other end thereof, the coupling member limiting a movement of the partition wall toward the second chamber and allowing the second chamber to inflate and deploy when the airbag inflates, wherein when the inflator is activated and when the airbag inflates and deploys, the coupling member causes the discharge-state switching member to apply tension to the partition wall side to close the vent holes, and when the inflated and deployed airbag receives an entering occupant and deforms, the coupling member releases the tension to the discharge-state switching member toward the partition wall side to open the vent holes.

The invention according to claim 2 is the airbag device according to claim 1, wherein the discharge-state switching member has a pair of strip members, one end portions of the pair of strip members are attached to an opening in the airbag, and the other end portions are bonded to each other to cover the opening, whereby openings on both sides between the one end portions and the other end portions of the pair of strip members define the vent holes.

The invention according to claim 3 is the airbag device according to claim 1, wherein the discharge-state switching member has a pair of base fabric pieces having one end portions surrounding the opening in the airbag and the other end portions bonded to each other and covering the opening, and the openings on both sides between the one end portions and the other end portions of the pair of base fabric pieces define the vent holes.

The invention according to claim 4 is the airbag device according to any one of claims 1 to 3, wherein the discharge-state switching member with the vent holes is drawn out of the airbag and opens the vent holes in the discharge state, and the discharge-state switching member with the vent holes is drawn into the airbag and closes the vent holes in the non-discharge state.

The invention according to claim 5 is the airbag device according to any one of claims 1 to 4, further including a check valve at the gas passage of the partition wall, the check valve allowing the gas to flow from the first chamber to the second chamber and blocks a gas flow from the second chamber to the first chamber.

The invention according to claim 6 is the airbag device according to any one of claims 1 to 5, wherein the discharge-state switching member is arranged at a lateral portion of the airbag in an inflated and deployed configuration.

The invention according to claim 7 is the airbag device according to any one of claims 1 to 6, wherein the vent holes reside at positions away from the airbag of the discharge-state switching member.

The invention according to claim 8 is an airbag device including an airbag inflatable and deployable by gas and an inflator supplying the gas to the airbag, the improvement including: a partition wall dividing the inside of the airbag into a first chamber on the inflator side and a second chamber on the occupant side and having a gas passage which enables the gas to flow between the first chamber and the second chamber; first and second discharge-state switching members in the first chamber of the airbag, the discharge-state switching members having first and second vent holes for discharging the gas in the airbag respectively and capable of switching the first and second vent holes between a discharge state discharging the gas in the airbag and a non-discharge state not discharging the gas; a first coupling member having one end coupled to the first discharge-state switching member and the other end coupled to the partition wall; and a second coupling member having one end coupled to the second discharge-state switching member and the other end coupled to a lower position on the first chamber side in the airbag in an inflated and deployed configuration, wherein when the inflator is activated and when the airbag inflates and deploys, the first and second coupling members cause the first and second discharge-state switching members to apply tension to close the vent holes respectively, and when the inflated and deployed airbag receives an entering occupant and deforms, the first coupling member is loosened and releases the tension to the discharge-state switching member to open the first vent hole, and when the inflating and deploying airbag receives the occupant, the first and/or second coupling member opens the first and/or second vent hole.

The invention according to claim 9 is the airbag device according to claim 8, further including: a second partition wall dividing the first chamber of the airbag in an inflated and deployed configuration to define a third chamber and having a gas passage which enables the flow between the first chamber and the third chamber, wherein the other end of the second coupling member is coupled to the second partition wall.

The invention according to claim 10 is the airbag device according to claim 8 or 9, wherein the first and/or second discharge-state switching member has a pair of base fabric pieces having one end portions that surround an opening in the airbag and the other end portions that are bonded to each other and cover the opening, and openings on both sides between the one end portions and the other end portions of the pair of base fabric pieces provide the vent holes.

The invention according to claim 11 is the airbag device according to any one of claims 8 to 10, wherein the first and second discharge-state switching members with the vent holes are individually drawn out of the airbag and open the vent holes in the discharge state and the first and second discharge-state switching members together with the vent holes are individually drawn into the airbag and close the vent holes in the non-discharge state.

The invention according to claim 12 is the airbag device according to any one of claims 8 to 11, wherein the first and second discharge-state switching members are individually arranged in each of the lateral portions of the airbag in an inflated and deployed configuration.

The invention according to claim 13 is the airbag device according to any one of claims 8 to 12, further including: a check valve provided to the gas passage of each partition wall, the check valve allowing the gas to flow from the first chamber to the second chamber or the third chamber and blocks a gas flow from the second chamber or the third chamber to the first chamber.

The invention according to claim 14 is the airbag device according to any one of claims 8 to 13, wherein the vent holes reside at positions of the first and/or second discharge-state switching member away from the airbag.

The invention according to claim 15 is the airbag device according to any one of claims 1 to 14, wherein the second chamber is defined by placing a base fabric piece for partition wall on a base fabric piece for airbag, and bonding the base fabric piece for partition wall to the base fabric piece for airbag so that the second chamber is positioned between the base fabric piece for partition wall and the base fabric piece for airbag.

The invention according to claim 16 is the airbag device according to any one of claims 1 to 15, wherein the second chamber is a head restraining portion for receiving and restraining an occupant's head entering the airbag that is inflating and deploying.

The invention according to claim 17 is an airbag device including an airbag inflatable and deployable by gas and an inflator supplying the gas to the airbag, the improvement includes: a partition wall dividing the inside of the airbag into a first chamber on the inflator side and a second chamber on the occupant side and having a gas passage which enables the gas to flow between the first chamber and the second chamber; first and second panel members constituting side panels of the airbag, the first and second panel members including a junction for bonding the panel members to each other and base fabric pieces adjacent to the junction; a discharge-state switching member which is formed by bonding the base fabric pieces each other, discharge-state switching member being arranged on the first chamber side when the panel members are bonded, and having vent holes communicating with an opening adjacent to the bonded portion between the panel members; and a coupling member having one end coupled to the discharge-state switching member and the other end coupled to the partition wall, the coupling member defining the second chamber in the airbag for receiving an occupant entering the airbag that is inflating and deploying, wherein when the airbag inflates and deploys, the coupling member causes the discharge-state switching member to apply tension to close the vent holes, and when the inflated and deployed airbag receives an entering occupant and deforms, the coupling member is loosened and releases the tension to the discharge-state switching member to open the vent holes.

The invention according to claim 18 is the airbag device according to claim 17, wherein the base fabric pieces are integrated with the first and second panel members, and are bonded to each other at the distal end portions thereof to define openings for the vent holes along the side edges thereof.

The invention according to claim 19 is the airbag device according to claim 17 or 18, wherein the side panels are integrated with a center panel to constitute the airbag, and the other end of the coupling member is coupled to a portion on an occupant side of the center panel.

The invention according to claim 20 is the airbag device according to any one of claims 17 to 19, wherein the second chamber is positioned so as to receive an occupant not seated in a predetermined normal position.

Advantages of the Invention

According to the present invention, an airbag device is provided in which an airbag provides an enhanced restraining force to an occupant and a more ensured limitation of the movement of the occupant in a collision or the like, and also, even when the occupant is in OOP for example, the impact to the occupant is more reliably reduced by discharging gas from the airbag without fail, so that the protective function to the occupant of the airbag device can be improved.

BRIEF DESCRIPTION OF THE DRAWINGS

FIG. 19 is a plan view of a side panel of an airbag according to a third embodiment: FIG. 19A is an exploded plan view of side panel members; and FIG. 19B is a plan view of the assembled side panel members;

FIG. 20 is a developed plan view of a center panel according to the third embodiment;

FIG. 21 is a view illustrating a process for integrally assembling side panels and a center panel according to the third embodiment.

DESCRIPTION OF SYMBOLS 1, 1S ... airbag device, 2 ... inflator, 5S, 5P ... occupant, 10 ... airbag, 10A ... first chamber, 10B ... second chamber, 10C ... front portion, 10D ... side portion or lateral portion, 10F ... third chamber, 11 ... partition wall, 14 ... second partition wall, 20 ... gas inlet port, 22 ... gas passage, 23 ... opening, 25 ... check valve, 28 ... first opening, 29 ... second opening, 30 ... discharge-state switching members, 30A ... bonded portion, 30B ... bonded portion, 30C ... bonded portion, 30K ... base fabric piece, 30H ... vent hole, 31 ... first discharge-state switching member, 31B ... bonded portion, 31C ... bonded portion, 31H ... vent hole, 31K ... base fabric piece, 32 ... second discharge-state switching member, 32H ... vent hole, 32K ... base fabric piece, 40 ... tether belt, 41 ... first tether belt, 42 ... second tether belt, 50 ... discharge-state switching member, 51 ... base fabric piece, 51B ... lower-side portion, 51C ... upper-side portion, 51D ... oblique-side portion, 51H ... vent hole, 55 ... tether belt, 60 ... discharge-state switching member, 61 ... base fabric piece, 61B ... lower-side portion, 61C ... upper-side portion, 61D ... oblique-side portion, 61H ... vent hole, 65 ... tether belt, 70 ... discharge-state switching member, 71 ... base fabric piece, 71B ... lower-side portion, 71C ... upper-side portion, 71D ... oblique-side portion, 71H ... vent hole, 75 ... tether belt, 80 ... side panel, 80A ... first side panel member, 80B ... second side panel member, 82A, 82B ... second straight portion, 84A, 84B ... oblique-side portion, 86A, 86B ... first straight portion, 88A, 88B ... outer peripheral portion, 90 ... center panel, 92 ... first rectangular portion, 92A ... gas inlet port, 94 ... second rectangular portion, 96 ... central portion, 96 (1), 96 (2) ... panel, 98 ... tether belt, 95 ... gas passage, F ... discharge-state switching member, FA, FB ... base fabric piece

BEST MODE FOR CARRYING OUT THE INVENTION

Now, several embodiments of an airbag device according to the present invention will be explained below with reference to the drawings.

An airbag device according to the present invention is an airbag device for driver seat or passenger seat that is installed to a steering wheel or an instrument panel of a vehicle for example to protect an occupant, and will be explained below in each embodiment through an example of an airbag device for passenger seat.

First Embodiment

Figure 1:
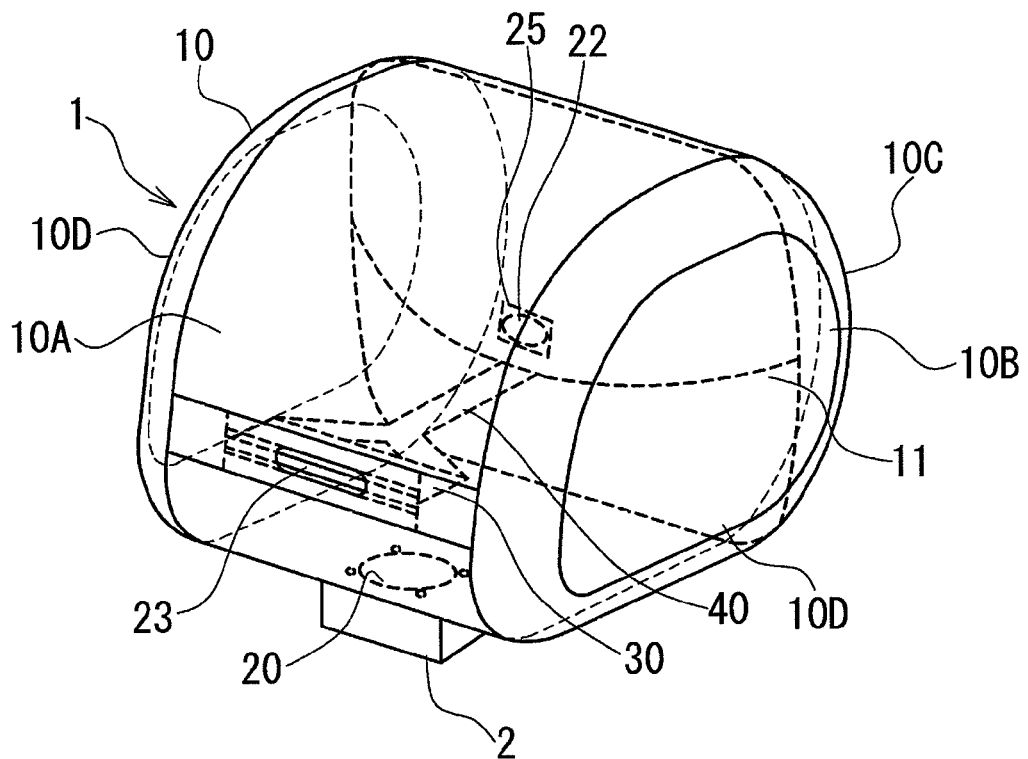
FIG. 1 is a perspective view showing an airbag device of a first embodiment with an inflated and deployed airbag.
Figure 2:
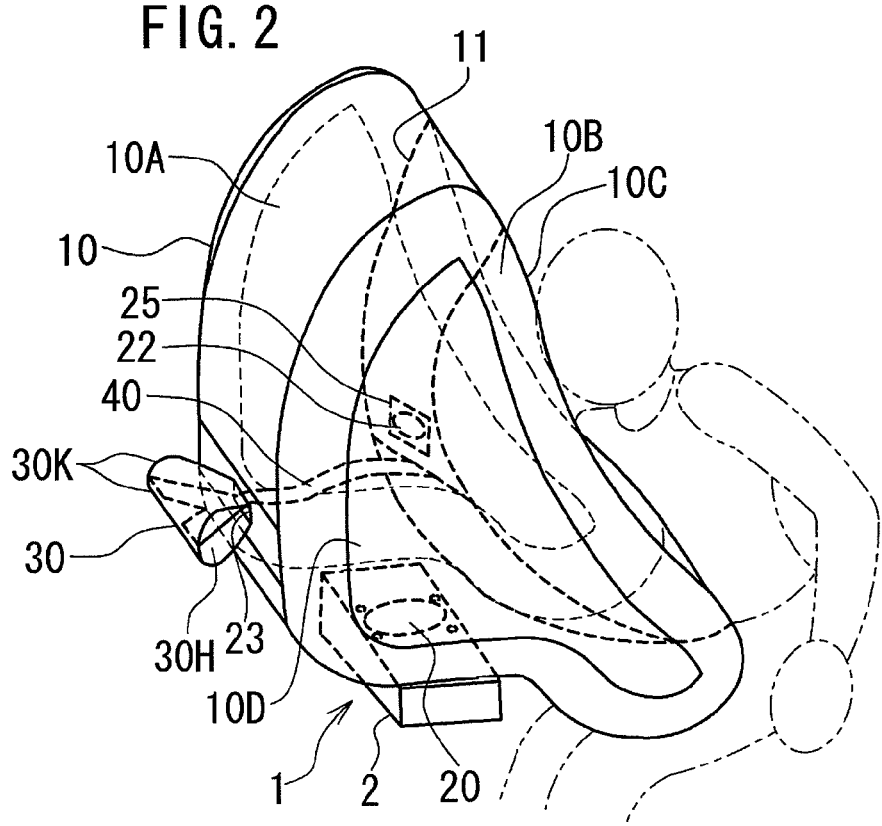
FIG. 2 is a perspective view showing the inflated and deployed airbag of FIG. 1 that is receiving an occupant.

FIG. 1 is a perspective view showing an airbag device of a first embodiment with an inflated and deployed airbag, and FIG. 2 is a perspective view showing the inflated and deployed airbag that is receiving an occupant.

An airbag device 1 of the present embodiment includes, as shown, an airbag 10 that is inflatable and deployable by a gas, and an inflator 2 attached to a gas inlet port 20 that is provided in a lower surface of the airbag 10.

The inflator 2 is installed in an instrument panel of a vehicle for example, together with an airbag 10 that is folded in a predetermined manner, and supplies a gas into the airbag 10 through the gas inlet port 20 in a vehicle collision or the like. The inflator 2 uses the gas to inflate and deploy the airbag 10 toward an occupant (to the upper right of FIG. 1; and to the generally right of FIG. 2).

The airbag 10 is in a bag-like form that is inflatable and deployable into a generally fan shape as seen laterally, and is provided by bonding opposite longitudinal ends of one piece of generally strip-shaped base fabric to each other by sewing, adhering, welding, or the like to form a cylinder, and bonding a pair of side fabrics to the peripheries of the openings on the opposite sides of the cylinder to close the sides of the cylinder, for example. The airbag 10 includes a partition wall 11 that divides the inner space of the airbag 10 at a predetermined position, and a tether belt 40 that is a limiting member at a predetermined position for limiting the movement of the partition wall 11 when the airbag 10 inflates, and the airbag 10 further includes an opening 23 provided in one side (a first chamber 10A side which will be explained later) of the space divided by the partition wall 11 for communication between the inside and outside of the airbag 10. The airbag 10 further includes a switch-vent hole mechanism (discharge-state switching member 30) at the opening 23 that is switchable between gas discharge states depending on the situation of the discharge-state switching member 30, and the discharge-state switching member 30 is coupled to the partition wall 11 by the tether belt 40.

The partition wall 11 defines a first chamber 10A on the inflator 2 side and a second chamber 10B on the occupant side in the inflated and deployed airbag 10, and the second chamber 10B is defined herein as a head restraining portion for receiving and restraining an occupant's head that is the main object entered the inflated and deployed airbag 10, and also as a smaller chamber having a smaller volume than that of the first chamber 10A. The second chamber 10B of the present embodiment is defined by placing a base fabric piece for partition wall 11 on a base fabric piece for airbag 10, and bonding the pieces together at a predetermined position, so that the base fabric piece for partition wall 11 is bonded to the base fabric piece for airbag 10 and the second chamber 10B is positioned between the base fabric pieces.

That is, the second chamber 10B is defined by superimposing a base fabric piece for partition wall 11 that constitutes the partition wall 11 (for example, a silicon-coated base fabric piece) onto a portion to provide the second chamber 10B (the front portion 10C of the airbag 10 opposite to the occupant) of a base fabric piece for airbag 10 that constitutes the airbag 10, and bonding the portions of the base fabric pieces corresponding to the boundary between the airbag 10 and the partition wall 11 to each other. Therefore, the airbag 10 can be formed in a sac shape by cutting a base fabric having generally the same or similar shape to that of the front portion 10C of the airbag 10 as a base fabric piece for partition wall 11, and superimposing the cut base fabric piece onto the flat base fabric piece for airbag 10 before the bonding into a sac shape, sewing the periphery of the base fabric piece for partition wall 11 to the base fabric piece for airbag 10 in a flat state, and bonding the sewn piece to the other base fabric piece, for example.

The partition wall 11 includes a gas passage 22 such as a generally circular communication hole provided at a slightly upper position above the generally central portion of the partition wall 11 for a gas flow between the first chamber 10A and the second chamber 10B, and also the gas passage 22 is provided with a check valve 25 for controlling the gas flow. The check valve 25 is an one-way valve that allows the gas flow from the first chamber 10A to the second chamber 10B but blocks back flow of the gas from the second chamber 10B to the first chamber 1A, and is provided to the gas passage 22, for example by placing a base fabric piece that has a enough size to close the gas passage 22 onto the gas passage 22 from the second chamber 10B side to cover the gas passage 22, and bonding the base fabric piece to the partition wall 11 at several positions along the periphery of the base fabric piece to fix the base fabric piece to the partition wall 11.

The partition wall 11 may be formed and arranged depending on an application and a shape of the airbag device 1 so that the defined second chamber 10B of the airbag 10 is able to receive and restrain an occupant in a collision of vehicle, which will be explained later. That is, the partition wall 11 is formed to have an appropriate size and shape and is arranged at an appropriate position of the airbag 10 depending on the size and shape of the body part of an occupant to be restrained (an occupant's head in the present embodiment) or the entire airbag 10 and the shape of the inflated and deployed airbag 10 so that the inflated and deployed second chamber 10B has a size and shape that enables the application of an adequate restraining force to an occupant, and is arranged at a position that enables a safe receipt of the occupant.

The opening 23 is a long communication section (communication hole) (for example, an oblong through hole that is laterally long) on the first chamber 10A side of the airbag 10 for communication between the inside and the outside of the airbag 10, and is provided at a diagonally upper position from the gas inlet port 20 (a position opposite to a front window in front of a passenger seat) in the surface opposite to the partition wall 11 when the airbag 10 is inflated and deployed.

While the airbag 10 is folded before inflation, the gas passage 22 in the partition wall 11 is positioned downstream of the gas supplying direction and opposite to the gas inlet port 20, which facilitates the gas flow from the gas inlet port 20 when the airbag 10 inflates. To the contrary, the opening 23 relatively close to the gas inlet port 20 is positioned upstream of the gas supplying direction. While the airbag 10 is inflating, the gas from the gas inlet port 20 does not easily flow in the through hole (communication hole) at the above described position, and also at the beginning of the inflation of the airbag 10, the air tends to be led by the gas flow in the airbag 10 and flow into the airbag 10 from the outside of the airbag 10. Therefore, the opening 23 is provided at a position that does not readily permit a gas flow therethrough during the inflation and deployment of the airbag 10, and the gas easily flows therethrough when the gas is discharged after the inflation and deployment of the airbag 10 because an occupant in contact with the front portion 10C of the airbag 10 pushes the gas in the airbag 10 toward the opening 23.

The discharge-state switching member 30 is a member having vent holes 30H (see FIG. 2) for discharging the gas in the airbag 10, and as shown in FIG. 1, when the airbag 10 inflates and deploys, the discharge-state switching member 30 is incorporated in the airbag 10 together with the portion having the vent holes 30H to cover and block the opening 23 and closes the vent holes 30H, so that the vent holes 30H are switched to a non-discharge state where the discharge of the gas in the airbag 10 is suppressed while the inflator 2 is being activated. On the contrary, when the inflated and deployed airbag 10 receives an occupant, as shown in FIG. 2, the discharge-state switching member 30 is drawn out from the airbag 10 together with the portion having the vent holes 30H to open the vent holes 30H, so that the vent holes 30H are switched to a discharge state where the discharge of the gas in the airbag 10 is achieved through the vent holes 30H. The discharge-state switching member 30 of the present embodiment switches the state of the vent holes 30H depending on a tension applied by the coupled tether belt 40 or an inner pressure of the airbag 10: that is, the discharge-state switching member 30 is configured to be able to switch the vent holes 30H between the state where the gas in the airbag 10 is discharged and the state where the gas is not discharged.

The discharge-state switching member 30 does not have to completely prevent the gas flow from the airbag 10 in the above described non-discharge state, and a certain amount of gas may be discharged. Thus, in the present invention, with respect to the discharge-state switching member (not only the discharge-state switching member 30, but also the discharge-state switching members which will be explained later are included), a non-discharge state or a state of non-discharge includes a state where gas discharge can be suppressed in addition to a state where gas discharge can be prevented.

Now, the discharge-state switching member 30 and the other component will be explained below in more detail.

Figure 3:
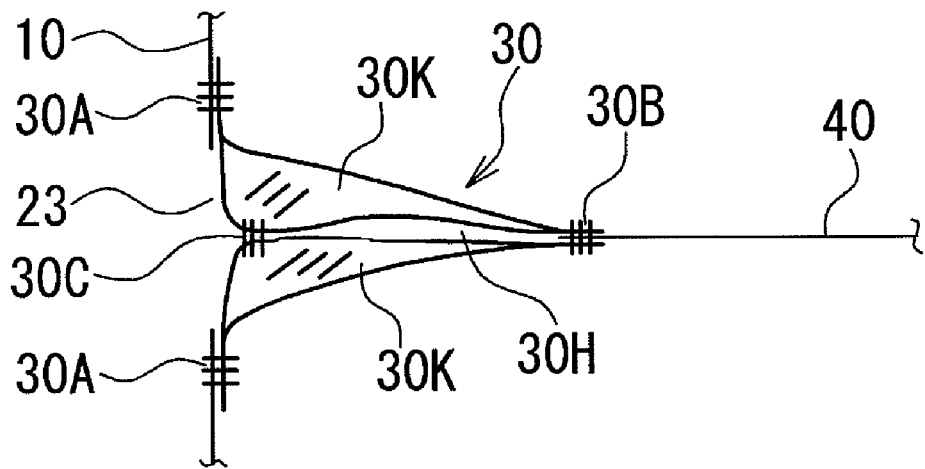
FIG. 3 is an enlarged side view schematically showing a discharge-state switching member in a non-discharge state of FIG. 1.
Figure 4:
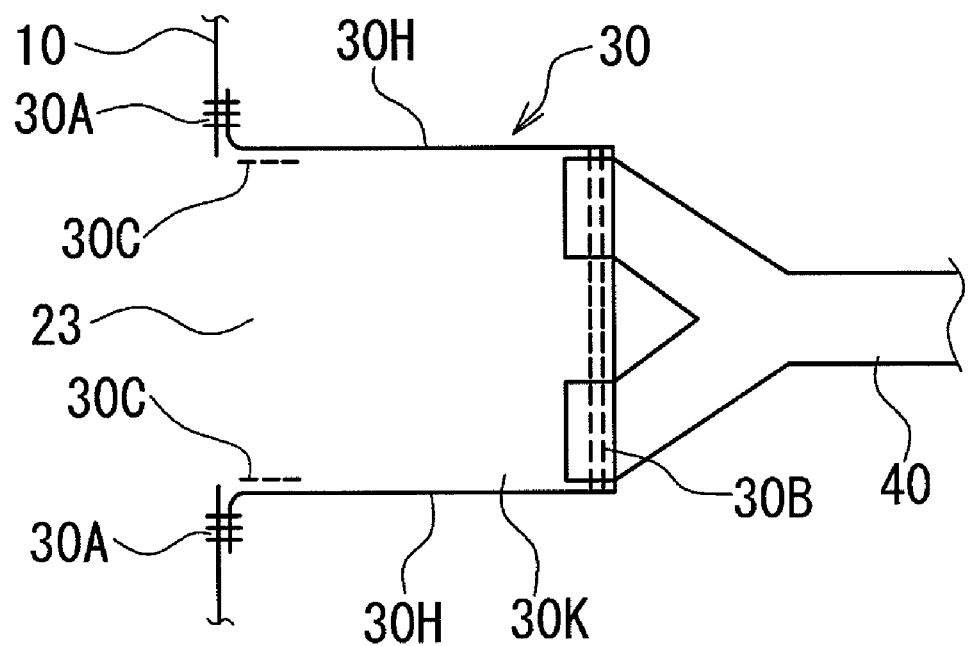
FIG. 4 is an enlarged plan view schematically showing the discharge-state switching member in the non-discharge state of FIG. 1.
Figure 5:
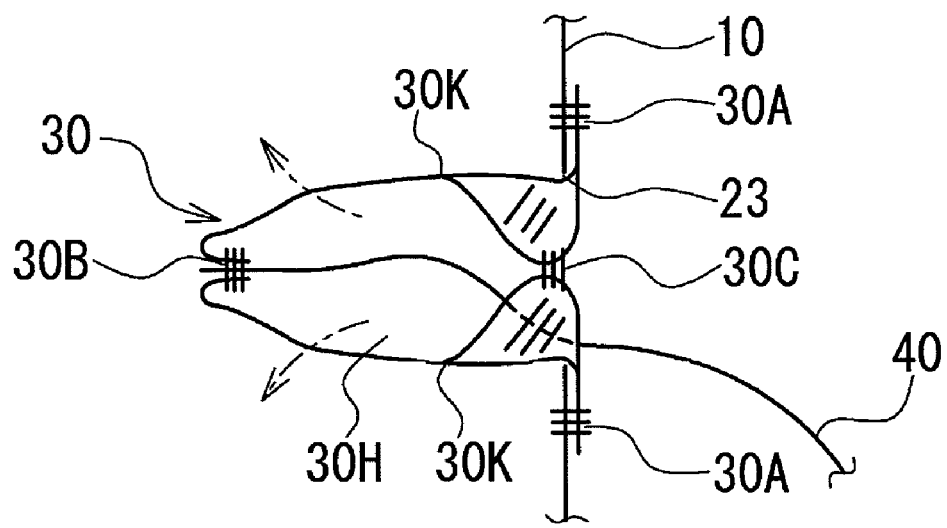
FIG. 5 is an enlarged side view schematically showing a discharge-state switching member in a discharge state of FIG. 2.
Figure 6:
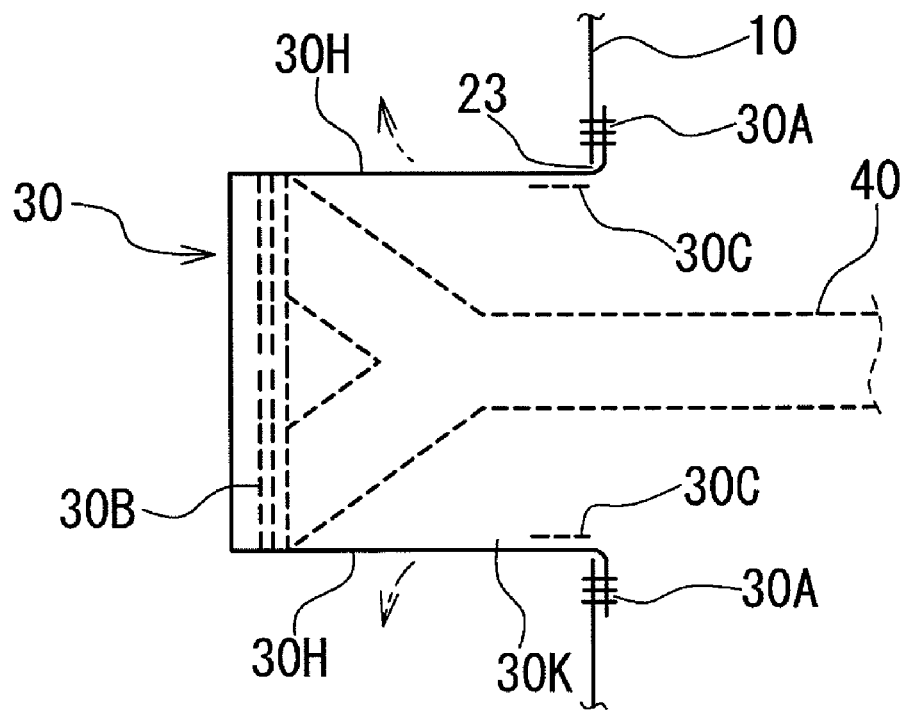
FIG. 6 is an enlarged plan view schematically showing the discharge-state switching member in the discharge state of FIG. 2.

FIGS. 3 and 4 are enlarged views schematically showing the discharge-state switching member 30 in the non-discharge state: FIG. 3 is a side view; and FIG. 4 is a plan view. FIGS. 5 and 6 are enlarged views schematically showing the discharge-state switching member 30 in the discharge state: FIG. 5 is a side view; and FIG. 6 is a plan view.

The discharge-state switching member 30 includes, as shown in FIGS. 3 to 6, generally rectangular base fabric pieces 30K that have a pair of strip members (strip-shaped fabrics) that have one end portions surrounding the opening 23 and the other end portions formed by bonding to each other and are vertically overlapped to each other to cover the opening 23: in FIGS. 3 and 5, the laterally seen upper and lower surfaces of the upper and lower base fabric pieces 30K are shown with shade, respectively. The one end portions (proximal end portion) of the pair of the base fabric pieces 30K on the airbag 10 side are individually attached by bonding (bonded portions 30A in FIGS. 3 to 6) such as sewing to the inner or outer surface of the airbag 10 (to the inner surface in the present embodiment) to surround the peripheral portion of the opening 23. The other end portions (distal end portions) of the base fabric pieces 30K are bonded to each other (a bonded portion 30B in FIGS. 3 to 6) generally entirely along the direction of the width. Both of the side portions are bonded to each other (bonded portions 30C in FIGS. 3 to 6) only at a position near the proximal end portions on the airbag 10 side, and the other portions, that is, the portions from the bonded portions 30C to the bonded portion 30B of the distal end portions are not bonded to be open (unbonded portions). Therefore, the inside and the outside of the airbag 10 are communicating with each other via the openings (unbonded portions) on the both sides of the pair of the base fabric pieces 30K, and in the present embodiment, the both side portions (openings) of the pair of the base fabric pieces 30K surrounding the unbonded portions define the vent holes 30H of the discharge-state switching member 30.

Because the both side portions of the pair of the base fabric pieces 30K are bonded (the bonded portions 30C) for a predetermined length at a position near the proximal end portions on the airbag 10 side, the vent holes 30H are not continuous to the opening 23 of the airbag 10, but is separated by the bonded portions 30C. The pair of the base fabric pieces 30K has a larger width than that of the opening 23 of the airbag 10, thereby the discharge-state switching member 30 also has a larger width than that of the opening 23. As a result, the discharge-state switching member 30 (base fabric pieces 30K) is deformed to reduce the size in the width direction to pass through the opening 23 when moving from the inside (see FIG. 1) to the outside (see FIG. 2) of the airbag 10 or vice-versa. Thus, a predetermined resistive force is applied to the discharge-state switching member 30 while passing through the opening 23, and because of the resistive force any unexpected movement of the discharge-state switching member 30 and a resulting switching between the discharge state and the non-discharge state can be prevented when a predetermined amount of tension or more by the tether belt 40 or the inner pressure of the airbag 10 (which will be explained later) is not applied.

The tether belt 40 is a coupling member having a predetermined length for coupling the discharge-state switching member 30 to the partition wall 11, and is formed by cutting a base fabric similar to that of the airbag 10 into generally strip-shaped or string-shaped fabric for example. In the present embodiment, the tether belt 40 is formed into an elongated strip member that is split into a generally Y shape at a distal end thereof (see FIGS. 4 and 6), and the width of the generally Y shaped distal end is generally equal to that of the distal end portion of the discharge-state switching member 30. The end of the strip portion of the tether belt 40 is bonded to the partition wall 11 (see FIGS. 1 and 2) at the position below the gas passage 22 at the generally central portion of the partition wall 11 and opposite to the opening 23, by sewing for example. To the contrary, both of the generally Y-shaped distal end portions on the other end side of the tether belt 40 are bonded (the bonded portion 30B in FIGS. 4 and 6) to the sides of the distal end portion of the discharge-state switching member 30 (see FIGS. 4 and 6) to pull the distal end portion of the discharge-state switching member 30, so that tension or a pulling force is exerted by the discharge-state switching member 30.

The tether belt 40 coupled to the discharge-state switching member 30 and the partition wall 11 as described above causes the partition wall 11 coupled to the one end thereof to apply tension to the discharge-state switching member 30 coupled to the other end thereof, so that the movement of the partition wall 11 toward the second chamber 10B is limited and the inflation of the second chamber 10B is promoted, which enables a rapid inflation and deployment of the second chamber 10B. Also, when the inflator 2 is activated and the airbag 10 inflates and deploys, the tether belt 40 causes the discharge-state switching member 30 to apply tension to the other end side (the partition wall 11 side) to close the vent holes 30H, and after the inflated and deployed airbag 10 receives an occupant therein, the tether belt 40 causes the discharge-state switching member 30 to release the tension to the partition wall 11 side, and opens the vent holes 30H. In this way, the tether belt 40 has a function to switch the vent holes 30H of the discharge-state switching member 30 between a state where the gas in the airbag 10 is discharged and a state of non-discharge, by the tension or the like.

That is, when the inflator 2 is activated and the airbag 10 inflates and deploys into a normal shape (see FIG. 1), the tether belt 40 is pulled between the partition wall 11 and the discharge-state switching member 30 under the inflation and deployment force generated by a gas supply from the inflator 2. The tether belt 40 is configured to have a length so that, in the above situation, the tether belt 40 causes the bag-like second chamber 10B to almost completely inflate and deploy, and also draws and pulls the discharge-state switching member 30 into the airbag 10 in a generally straight line against the inner pressure of the airbag 10 due to the gas from the inflator 2 (see FIGS. 3 and 4) to close and switch the vent holes 30H to a non-discharge state.

Moreover, during the airbag 10 is inflating also, in accordance with the inflation and deployment, the tether belt 40 gradually pulls the partition wall 11 coupled to the other end thereof toward the one end thereof using the discharge-state switching member 30 coupled to the one end thereof, and controls the movement of the partition wall 11 to draw the partition wall 11 into the first chamber 10A, so that the partition wall 11 (the second chamber 10B) is expanded in the first chamber 10A. In the expansion, the tether belt 40 pulls the generally central portion of the partition wall 11 that protrudes most on the first chamber 10A side when the partition wall 11 completely inflates and deploys, so that the second chamber 10B can inflate generally uniformly toward the first chamber 10A. Also, the tether belt 40 causes the discharge-state switching member 30 to apply tension to the partition wall 11 to close the vent holes 30H and switch the vent holes 30H to the non-discharge state relatively early during the inflation and deployment.

On the contrary, when the inflated and deployed airbag 10 receives an occupant and deforms (see FIG. 2), the second chamber 10B that maintains the inner pressure deforms to accept the occupant, and so the second chamber 10B and the partition wall 11 deform into a convex shape toward the first chamber 10A side, and also the entire second chamber 10B is urged in the direction the occupant entered, and moves toward the opening 23. As a result, the inner pressure of the first chamber 10A is gradually increased and the distance between the opening 23 and the bonding position of the tether belt 40 to the partition wall 11 in the airbag 10 is decreased, which causes the tether belt 40 to be loosened between the partition wall 11 and the discharge-state switching member 30, resulting in the release of the tension to the partition wall 11. The tether belt 40 is configured to have a length which, in the above state, allows the discharge-state switching member 30 to be drawn out of the airbag 10 due to the inner pressure of the airbag 10 (see FIGS. 5 and 6), and the vent holes 30H to be opened and switched to the discharge state.

Next, the operation and function of each portion when the above described airbag device 1 of the present embodiment is activated will be explained below.

The airbag device 1 with the assembled airbag 10 and the inflator 2 is installed in a predetermined position (in an instrument panel or the like) in front of a passenger seat of a vehicle, and in the situation, the airbag 10 is folded in a predetermined manner with the discharge-state switching member 30 incorporated therein. In a vehicle collision or the like, the airbag device 1 causes the inflator 2 (see FIG. 1) to supply a gas through the gas inlet port 20 into the airbag 10, so that the first chamber 10A of the airbag 10 inflates. At the same time, a gas is introduced from the first chamber 10A through the gas passage 22 of the partition wall 11 into the second chamber 10B, so that the second chamber 10B inflates and deploys, resulting in the inflation and deployment of the entire airbag 10.

As the airbag 10 inflates and deploys, the tether belt 40 is gradually pulled by the discharge-state switching member 30 to control the movement of the partition wall 11, which promotes the inflation of the second chamber 10B and progresses the inflation and deployment of the airbag 10. At the same time, the tether belt 40 is pulled between the coupled portions, and a large tension is applied to the discharge-state switching member 30 in the airbag 10 that is coupled to the tether belt 40, and as the result of that the discharge-state switching member 30 substantially closes the vent holes 30H (see FIGS. 3 and 4) and covers the opening 23 for blocking in the airbag 10. The non-discharge state is maintained by the tension of the tether belt 40 to cause the airbag 10 to rapidly inflate and deploy while any discharge of the gas in the airbag 10 is suppressed and possible gas leak is minimized. When the airbag 10 and the second chamber 10B substantially inflate and deploy, the discharge-state switching member 30 is pulled tight toward the inside of the airbag 10 by the tether belt 40. The large tension allows the discharge-state switching member 30 to be maintained in the non-discharge state without fail against the inner pressure of the airbag 10.

In the state, when an occupant's head and the like moves forward due to the impact of a vehicle collision and contacts the front portion 10C of the airbag 10 (see FIG. 2), the airbag 10 (the second chamber 10B) receives the occupant, and the entire inflated and deployed airbag 10 deforms mainly in the direction the occupant entered. In the deformation, the second chamber 10B deforms into a concave shape to accept the occupant, but the check valve 25 prevents any gas flow from the inside, which maintains the deformed concave shape to restrain the occupant without fail. At the same time, the gas is compressed and the inner pressure is increased in the first chamber 10A, and also the entire second chamber 10B moves in the direction the occupant entered (toward the opening 23), and the partition wall 11 deforms into a convex shape, which causes the tether belt 40 to be loosened, resulting in the release of the tension applied to the discharge-state switching member 30 toward the partition wall 11. As a result, the discharge-state switching member 30 is urged by the inner pressure of the first chamber 10A and drawn out of the airbag 10 (see FIGS. 5 and 6), thereby the vent holes 30H are opened for communication between the inside and the outside of the first chamber 10A. As described above, switched from the non-discharge state (see FIG. 1) to the discharge state (see FIG. 2), the discharge-state switching member 30 discharges the gas in the first chamber 10A through the opening 23, the discharge-state switching member 30, and the vent holes 30H to the outside. This makes the first chamber 10A gradually shrunk to accept and protect the occupant softly in the airbag 10 while absorbing and reducing the impact in the collision to the occupant.

If the occupant is seated in an abnormal position by leaning forward for example, and contacts the airbag 10 earlier than usual, the airbag 10 is brought in contact with the occupant before the airbag 10 completely inflates and deploys, and a further inflation and deployment is disturbed. However, in such a case also, the gas can be discharged through the vent holes 30H because, in the airbag 10, the inner pressure of the first chamber 10A is increased with the tether belt 40 being loosened, and the discharge-state switching member 30 is urged out of the first chamber 10A by the inner pressure and is switched to the discharge state.

As explained above, in the airbag device 1 of the present embodiment, the airbag 10 is able to rapidly inflate and deploy because the opening 23 is provided at a position that does not readily permit a gas flow therethrough during the inflation of the airbag 10, and the discharge-state switching member 30 in the non-discharge state suppresses the gas discharge from the inflated airbag 10. As a result, the airbag 10 is able to provide an adequate restraining force to an occupant at an early state of the inflation. Therefore, even if an occupant is seated in an abnormal position by approaching the side of the airbag device 1 or leaning forward for example and contacts the airbag 10 earlier than usual, the occupant can be protected.

In addition, in the airbag device 1, a gas easily flows through the gas passage 22 of the partition wall 11 toward the second chamber 10B, and also the tether belt 40 limits the movement of the partition wall 11 toward the second chamber 10B to promote the inflation of the second chamber 10B, thereby the inflation and deployment of the second chamber 10B (the expansion of the partition wall 11 in the first chamber 10A) is achieved earlier without fail. Also, the tether belt 40 enables the control of an outgoing distance and an outgoing pressure of the partition wall 11 (the second chamber 10B) toward the occupant when the airbag 10 inflates, which improves the deployment property and protective function for the occupant of the airbag 10. Moreover, the airbag device 1 has no vent hole for gas discharge on the second chamber 10B side, but has the check valve 25 at the gas passage 22 in the partition wall 11, thereby no gas is discharged from the second chamber 10B even after the inflated and deployed second chamber 10B receives an occupant's head and the like, and the inner pressure can be maintained. This allows the second chamber 10B to maintain the deformed shape after an occupant is received therein, and the movement of the occupant's head and the like after collision can be further limited, which improves the occupant restraining force of the second chamber 10B (the airbag 10).

Furthermore, the airbag device 1 has the opening 23 provided at a position which is away from the bonding position between the second chamber 10B and the tether belt 40 where an occupant contacts the airbag 10, but on the first chamber 10A side where an occupant does not contact, thereby the discharge-state switching member 30 is unlikely to be affected by the deformation of the airbag 10 when an occupant enters the inflated and deployed airbag 10, and is drawn out of the airbag 10 (is switched to the discharge state) without fail. As a result, a large amount of gas can be stably discharged from the first chamber 10A without fail, that is, a sufficient amount of gas is discharged from the airbag 10, which improves the impact absorbing capability of the airbag 10. Also, because the one end of the tether belt 40 is bonded to the partition wall 11 that defines the second chamber 10B, wherever an occupant contacts the second chamber 10B of the airbag 10, the entire second chamber 10B moves toward the opening 23, or the partition wall 11 deforms into a convex shape due to the deformation of the second chamber 10B so as to loosen the tether belt 40. As the result, regardless the position where an occupant is received, the discharge state of the discharge-state switching member 30 can be switched, and the impact absorbing capability in collision can be improved. Even when an occupant is received during the inflation and deployment of the airbag 10, the gas discharge from the first chamber 10A can be achieved, which reduces the impact to the occupant in such a situation.

In addition, the discharge-state switching member 30 provides the bonded portions 30C between the vent holes 30H and the opening 23, and the vent holes 30H are provided at a position separated from the attachment (opening 23) of the discharge-state switching member 30 to the airbag 10. Thus, in the non-discharge state, the proximal end portions of the vent holes 30H on the airbag 10 side (mainly the portions around both of the bonded portions 30C) are in close contact with each other due to the inner pressure of the airbag 10, so that the closely contacted portion of the vent holes 30H functions as a valve. Thus, the gas is unlikely to leak through the vent holes 30H from the opening 23, and the gas discharge in the non-discharge state can be suppressed more reliably. Also, because both of the ends of the distal end portion of the discharge-state switching member 30 are pulled by the tether belt 40, the posture of the discharge-state switching member 30 in the airbag 10 is stabilized, and the non-discharge state can be reliably and stably maintained.

Therefore, according to the airbag device 1 of the present embodiment, an enhanced occupant restraining force of the airbag 10 in a vehicle collision or the like is provided, and an occupant's head is more reliably restrained by the second chamber 10B to more reliably limit the movement of the occupant in collision. The discharge-state switching member 30 enables the gas discharge from the airbag 10 in a more certain and adequate manner, which reduces the impact to an occupant, and effectively improves the protective function of the airbag device 1 to the occupant. This is particularly effective in the case where the second chamber 10B functions as a head restraining portion of the airbag 10 for restraining an occupant's head that has a higher need for protection. In addition, the partition wall 11 having a highly air-tight silicon-coated base fabric provides a higher effect.

Moreover, the airbag 10 requires a relatively small number of components in manufacturing, and has a relatively simple configuration: for example, the second chamber 10B can be defined by placing a base fabric piece for partition wall 11 onto a base fabric piece for airbag 10 and bonding the pieces to each other as described above. The discharge-state switching member 30 also can be realized by a relatively simple structure with one ends of the pair of the base fabric pieces 30K being attached to the opening 23 of the airbag 10 and the other ends being bonded together to cover the opening 23, and the openings on both sides providing the vent holes 30H. In this way, the airbag 10 of the present embodiment has a simple configuration and a simple structure for the functions, leading to a higher workability and productivity in manufacturing such as sewing and a lower cost for manufacturing the airbag 10.

In the present embodiment, the tether belt 40 is formed to have a length that extends between coupled portions in a generally straight line when the airbag 10 inflates and deploys, but the tether belt 40, even if somewhat loosened while the inflation and deployment, can limit the movement of the partition wall 11 or maintain the discharge-state switching member 30 in the non-discharge state. Therefore, the length of the tether belt 40 may vary to some degree.

In addition to the sizes of the opening 23 and the vent holes 30H of the discharge-state switching member 30 in the above described airbag 10, the configurations including the size of the gas passage 22 of the partition wall 11 may be appropriately set individually, depending on the configurations of the airbag 10 and the partition wall 11 (the second chamber 10B), the inflation and discharge pattern including a discharge rate required to the airbag 10. Similarly, in the present embodiment, only one gas passage 22 is formed in the partition wall 11, but any number of gas passages 22 may be formed at positions as needed, like a plurality of gas passages 22 at a plurality of points.

Furthermore, in the present embodiment, the gas passage 22 is provided with the check valve 25, but depending on the sizes of the gas passage 22 and the vent holes 30H, the check valve 25 may not be provided. The latter case is more preferably because when the amount of the gas drawn through the gas passage 22 (the second chamber 10B) is reduced relative to the amount of gas discharged through the vent holes 30H by reducing the size of the gas passage 22 relative to the vent holes 30H for example, the crash of the second chamber 10B is further prevented when an occupant contacts the second chamber 10B, which relatively increases the above described effects.

In addition to the above, in the present embodiment, the opening 23 of the airbag 10 is provided into an oblong hole which is laterally long, but may be in other shape such as a vertically long oblong hole, a circular hole, a polygonal hole that extends in a direction different from that in the present embodiment depending on various configurations including the direction in which the discharge-state switching member 30 is arranged or the position where the tether belt 40 is coupled. Also, in the airbag 10, the vent holes 30H are only provided to the discharge-state switching member 30, but another vent hole may be provided on the first chamber 10A side, such as hole-shaped vent holes in both sides of the first chamber 10A of the deployed airbag 10. In the latter case, various patterns of discharge can be set by combining the discharge through the other vent hole and the discharge through the discharge-state switching member 30.

The discharge-state switching member 30 may be folded at a position outside of the airbag 10 with the airbag 10, before the airbag device 1 is activated. Even in the case, the discharge-state switching member 30 is drawn into the airbag 10 by the tension (the pulling force into the airbag 10) of the tether belt 40 during the inflation and deployment and is switched into the non-discharge state, thereby the gas discharge is suppressed and the airbag 10 rapidly inflates and deploys. When the above described occupant in an abnormal position contacts the airbag 10 earlier than usual, the gas in the airbag 10 can be discharged without the switching from non-discharge state to the discharge state of the discharge-state switching member 30, which allows a large amount of gas to be discharged at an earlier stage, and the impact to the occupant can be further reduced.

The opening 23 of the airbag 10 and the discharge-state switching member 30 may be arranged at any positions where the discharge-state switching member 30 is switched to the discharge state and the gas discharge is not disturbed when the airbag 10 that completely inflated and deployed or is still inflating and deploying receives an occupant, and may be arranged at positions other than those on the first chamber 10A side of the airbag 10. Similarly, the tether belt 40 that is attached to the partition wall 11 and to a portion of the distal end portion of the discharge-state switching member 30 (the base fabric pieces 30K) is also able to switch the discharge states of the discharge-state switching member 30 and limit the movement of the partition wall 11, and so the both ends of the tether belt 40 may be attached in a different manner from that of the present embodiment. That is, the position of the opening 23 to which the discharge-state switching member 30 is attached and the position where the tether belt 40 is attached to the partition wall 11 have to be arranged so that the distance between the positions is decreased when the inflated and deployed airbag 10 receives an occupant therein.

For example, even if the opening 23 and the discharge-state switching member 30 are provided to the side portion (the portion 10D in FIGS. 1 and 2) or upper portion of the first chamber 10A of the airbag 10 in an inflated and deployed configuration, when the airbag 10 inflates and deploys, the tether belt 40 can draw the discharge-state switching member 30 into the airbag 10 and switches the discharge-state switching member 30 to the non-discharge state. Then, when the airbag 10 receives an occupant, the tether belt 40 is loosened and the discharge-state switching member 30 is drawn out of the airbag 10 and is switched into the discharge state, so that the operations similar to those described above can be achieved. Particularly, in the case where the opening 23 and the discharge-state switching member 30 are provided to the side portion 10D of the airbag 10, even when the discharge-state switching member 30 is shifted to the discharge state and is urged out of the airbag 10, any interference with a front glass or an in-dash panel of a vehicle can be prevented, resulting in a more stable discharge of the gas.

Next, another example of a discharge-state switching member will be explained below.

Figure 7A:
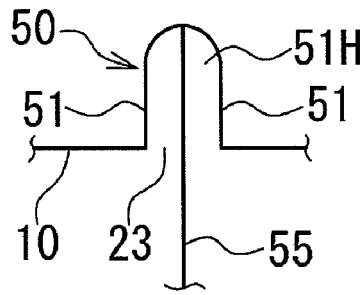
FIG. 7 is a schematic view showing a first modified example of a discharge-state switching member.
Figure 7B:
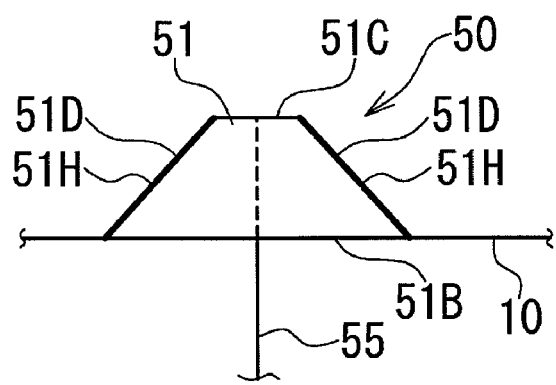

FIG. 7 is a schematic view showing a first modified example of a discharge-state switching member: FIG. 7A is a side view; and FIG. 7B is a plan view.

A discharge-state switching member 50 has, as shown, a pair of generally trapezoidal base fabric pieces (generally trapezoidal members) 51 that extend from the opening 23 of the airbag 10, and each of the lower-side portions 51B on the longer-side side is attached to the periphery of the opening 23 by sewing and bonding for example, and the upper portions (distal end portions) 51C on the shorter-side side are bonded to each other. The bonded portion of the upper portions 51 is coupled with one end of a long tether belt 55, so that both side portions surrounded by both of slanted oblique sides 51D of the pair of the base fabric pieces 51 provide vent holes 51H (shown by thick lines in FIG. 7B).

Figure 8A:
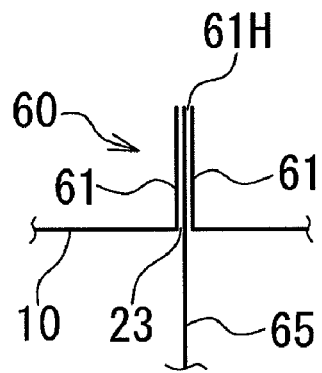
FIG. 8 is a schematic view showing a second modified example of a discharge-state switching member.
Figure 8B:
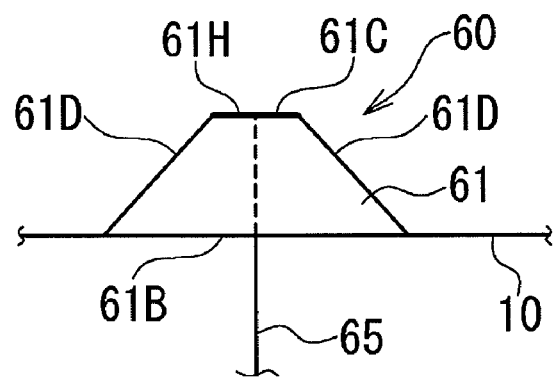

FIG. 8 is a schematic view showing a second modified example of a discharge-state switching member: FIG. 8A is a side view; and FIG. 8B is a plan view.

A discharge-state switching member 60 has, as shown, a pair of generally trapezoidal base fabric pieces (generally trapezoidal members) 61 that extend from the opening 23 of the airbag 10, with each of lower-side portions 61B on the longer-side side being attached to the periphery of the opening 23 by bonding for example as a proximal end portion on the opening 23 side, and both of slanted oblique sides 61D being bonded to each other. Upper side portions 61C on the shorter-side side of the pair of base fabric pieces 61 are coupled with one end of a long tether belt 65, so that the portion surrounded by both of the upper-side portions of the pair of the base fabric pieces 61 provides a vent hole 61H (shown by a thick line in FIG. 8B).

Figure 9A:
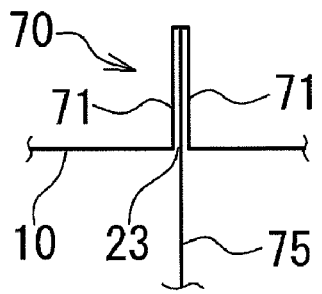
FIG. 9 is a schematic view showing a third modified example of a discharge-state switching member.
Figure 9B:
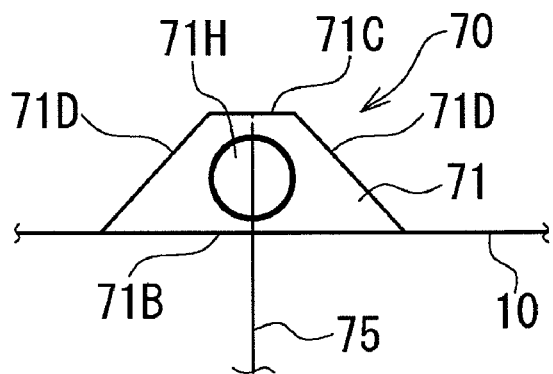

FIG. 9 is a schematic view showing a third modified example of a discharge-state switching member: FIG. 9A is a side view; and FIG. 9B is a plan view.

A discharge-state switching member 70 has, as shown, a pair of generally trapezoidal base fabric pieces (generally trapezoidal members) 71 that extend from the opening 23 of the airbag 10, and each of the lower-side portions 71B on the longer-side side is attached to the periphery of the opening 23 as a proximal end portion on the opening 23 side, and upper-side portions 71C on the shorter-side side and slanted oblique sides 71D are bonded to each other respectively. Each of upper-side portions 71C of the pair of base fabric pieces 71 is coupled with one end of a long tether belt 75, and a generally circular hole resides in one or both of the pair of base fabric pieces 71 to provide a vent hole 71H.

In the first to third modified examples of the discharge-state switching member also, similar to the above described discharge-state switching member 30, discharge-state switching members 50, 60, and 70 are drawn into or drawn out of the airbag 10 to be switched between the non-discharge state and the discharge state.

Second Embodiment

Next, a second embodiment of an airbag device according to the present invention will be explained below.

An airbag device 1S of the second embodiment basically has the same structures and configurations as those of the airbag device 1 of the above described first embodiment, and further includes a configuration to improve the protective function for an occupant in the above described OOP. Thus, the configurations similar to that described above are designated by the same reference numerals, and will not be explained below in detail.

Figure 10:
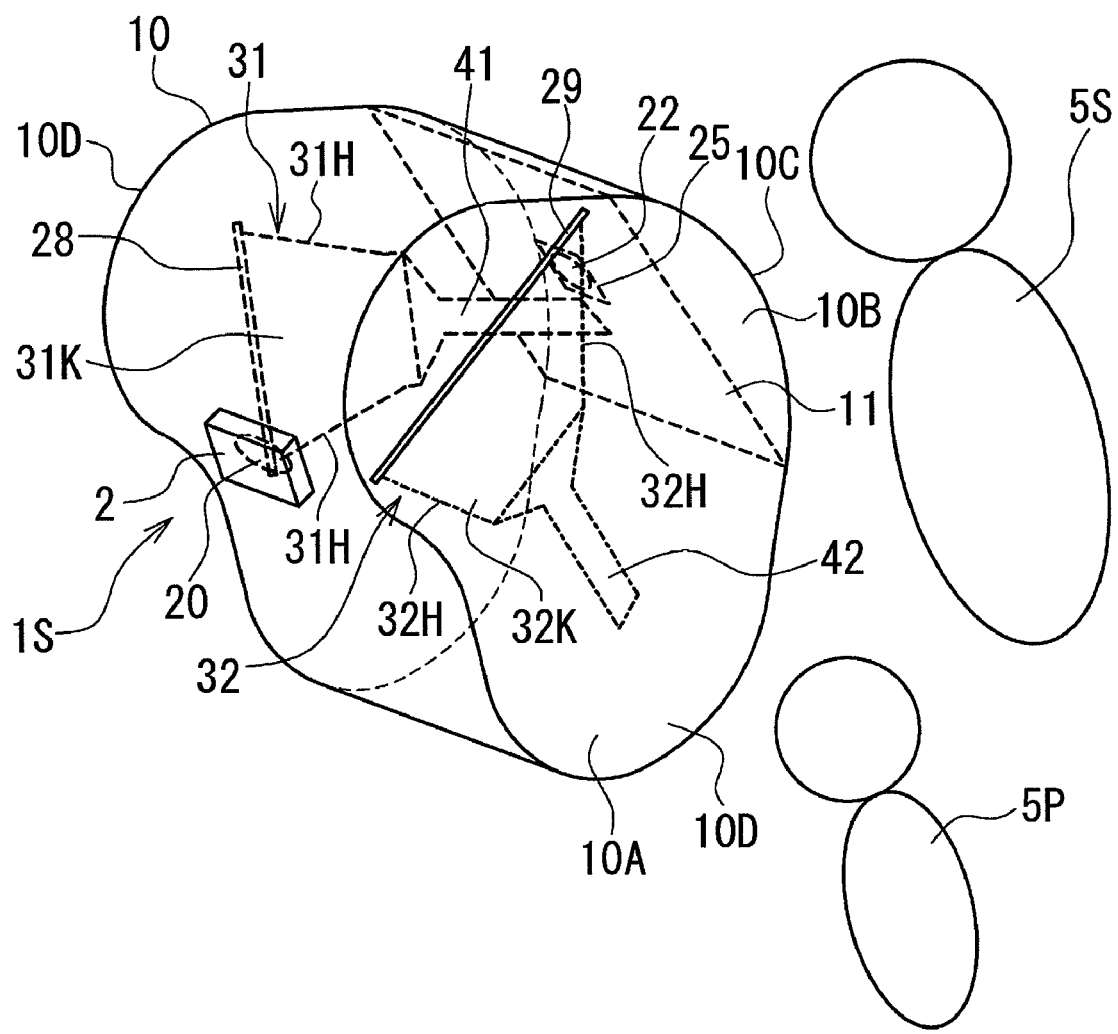
FIG. 10 is a perspective view showing an airbag device of a second embodiment with an inflated and deployed airbag.

FIG. 10 is a perspective view showing an airbag 10 of the airbag device 1S of the second embodiment that completed inflation and deployment, and also schematically shows an occupant 5S seated in a normal position and an occupant 5P in OOP.

The airbag device 1S includes, as shown, an airbag 10 which is inflatable and deployable by a gas, and an inflator 2 attached to a gas inlet port 20 that is provided in a lower surface of the airbag 10.

The inflator 2 supplies a gas into the airbag 10 through a gas inlet port 20 in a vehicle collision or the like to cause the airbag 10 to inflate and deploy in an upward, downward, leftward, and rightward directions about a direction toward the occupant 5S or 5P.

The airbag 10 is formed in an inflatable and deployable bag-like shape, and includes a partition wall 11 that divides the inner space of the airbag 110, a first tether belt 41 that is a limiting member for limiting the movement of the partition wall 11 when the airbag 10 inflates, and a second tether belt 42 having one end coupled to a lower portion of the airbag 10 below the partition wall 11, at predetermined positions therein individually.

The one side of the airbag 10 divided by the partition wall 11 (a first chamber 10A side) is provided with first and second openings 28 and 29 for communication between the inside and outside of the airbag 10, and also switch-vent hole mechanisms (discharge-state switching members 31 and 32) are provided to each of the openings 28 and 29 for switching discharge states of gas in the airbag 10 depending on the situation. As for the discharge-state switching members 31 and 32, the first discharge-state switching member 31 at the first opening 28 is coupled to the partition wall 11 via the first tether belt 41, and the second discharge-state switching member 32 at the second opening 29 is coupled to the lower portion of the airbag 10 via the second tether belt 42.

Figure 11A:
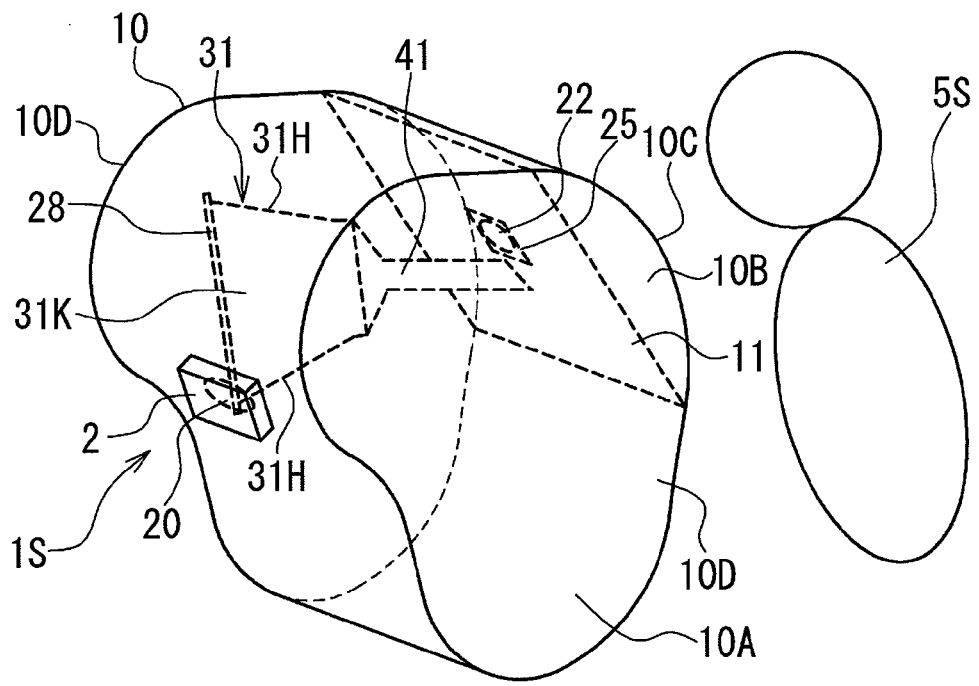
FIG. 11 is a perspective view individually showing the portions coupled by each tether belt of the airbag of FIG. 10.
Figure 11B:
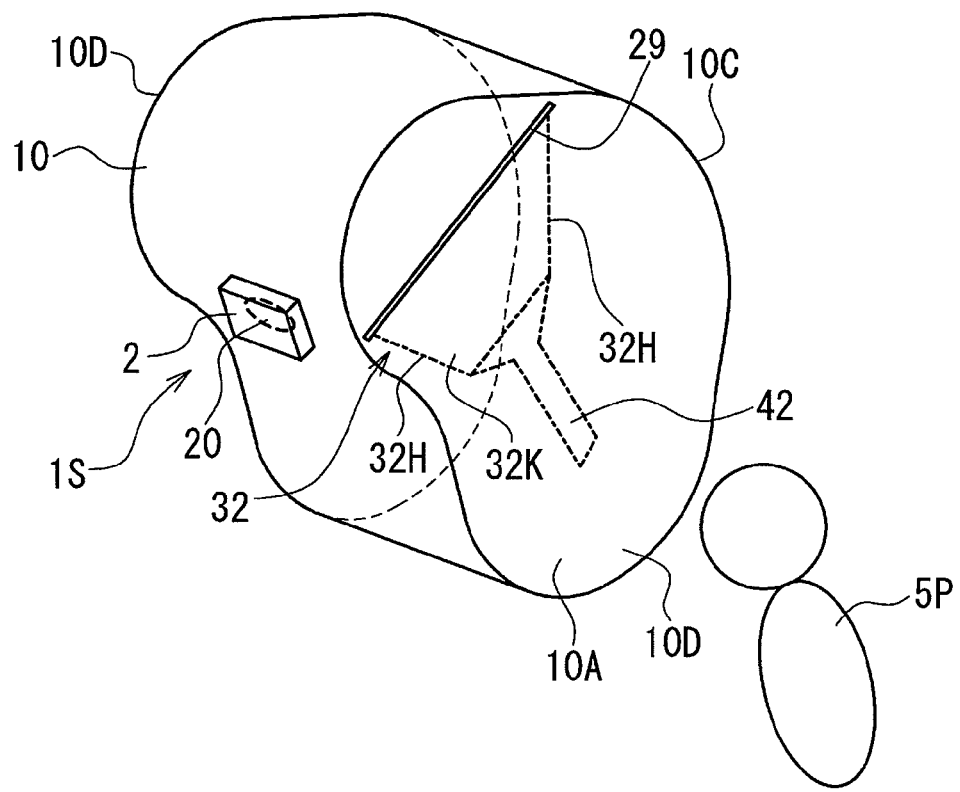

FIG. 11 is a perspective view individually showing the airbag 10 coupled to each of the tether belts 41 and 42 for easy understanding of the couplings of the airbag 10: FIG. 11A shows the airbag 10 coupled to the first tether belt 41; FIG. 11B shows the airbag 10 coupled to the second tether belt 42.

Now, for each of FIGS. 11A and 11B, each member will be explained below in detail.

As shown in FIG. 11A, the partition wall 11 coupled to the first tether belt 41 divides the inside of the inflated and deployed airbag 10 into a first chamber 10A on the inflator 2 side and a second chamber 10B on the occupant 5S side, and in the present embodiment, the second chamber 10B is divided as a smaller chamber having a smaller volume than that of the first chamber 10A. In the airbag device 1S, the partition wall 11 is arranged at and bonded to a relatively upper position on the occupant 5S side of the airbag 10, so that the second chamber 10B functions as a normal occupant restraining portion for receiving and restraining the occupant 5S seated mainly in a normal position after the airbag 10 inflates and deploys. That is, the partition wall 11 provides the second chamber 10B at a position mainly opposite to the upper body of the occupant 5S, so that the second chamber 10B receives the body part from the head to chest of the entering occupant 5S for restraint.

The occupant 5S seated mainly in a normal position as used herein means an occupant 5S who is seated in a normal (ordinary) posture with a seatbelt or ready to wear a seatbelt, or in a usual and general situation that is not very different from the normal posture, such as a posture somewhat closer to the airbag device 1S or a leaning forward posture from the normal posture. Therefore, the seated state mainly in a normal position in the present invention includes the normal position, and also the above described usual and general situation in slightly OOP.

In the present embodiment, the second chamber 10B is defined between base fabric pieces by placing a base fabric piece for partition wall 11 onto a portion of a base fabric piece for airbag 10 for the second chamber 10B (the front portion 10C of the airbag 10 opposite to the occupant 5S) and bonding the pieces to each other at predetermined positions. The partition wall 11 includes a gas passage 22 provided at the generally central portion thereof for a gas flow between the first chamber 10A and the second chamber 10B, and also a check valve 25 for controlling the gas flow through the gas passage 22.

The partition wall 11 is formed and arranged depending on the application and shape of the airbag device 1S so that the defined second chamber 10B of the airbag 10 is able to receive and restrain the occupant 5S in a collision of vehicle. That is, the partition wall 11 is formed to have an appropriate size and shape and is arranged at an appropriate position of the airbag 10 depending on the size and inflated and deployed configuration of the entire airbag 10 so that the inflated and deployed second chamber 10B has a size and shape that enable the application of an adequate restraining force to the occupant 5S, and is arranged at a position that enables a safe receipt of the occupant 5S.

The first opening 28 is a long communication section (communication hole) on the first chamber 10A side of the airbag 10 for communication between the inside and the outside of the airbag 10, and is provided in one of the lateral portions 10D (the side surface in the back in the plane of FIG. 10) of the airbag 10 in an inflated and deployed configuration. The first opening 28 is also provided at a position relatively close to the gas inlet port 20 away from the partition wall 11 at the lateral portions 10D of the airbag 10 at an angle near vertical (in the up-down direction in FIG. 11) in a straight line, and along the longitudinal direction, a first discharge-state switching member 31 is arranged.

While the airbag 10 is folded before inflation, the gas passage 22 in the partition wall 11 is positioned downstream of the gas supplying direction and opposite to the gas inlet port 20, which facilitates the gas flow from the gas inlet port 20 when the airbag 10 inflates. To the contrary, the first opening 28 relatively close to the gas inlet port 20 is positioned upstream of the gas supplying direction, and as described above, while the airbag 10 is inflating and deploying, the gas does not easily flow out of the first opening 28.

The first discharge-state switching member 31 is a member having vent holes 31H for discharging the gas in the airbag 10, and is configured to switch the vent holes 31H between a state where the gas in the airbag 10 is discharged and a state of non-discharge, depending on the tension applied by the coupled first tether belt 41 and the inner pressure of the airbag 10. That is, when the airbag 10 inflates and deploys, the first discharge-state switching member 31 is incorporated in the airbag 10 with the vent holes 31H to cover the first opening 28 for blocking, and closes the vent holes 31H, so that the vent holes 31H are switched to a non-discharge state where the discharge of the gas in the airbag 10 is suppressed while the inflator 2 is being activated. On the contrary, when the inflated and deployed airbag 10 receives an occupant 5S, the first discharge-state switching member 31 is drawn out of the airbag 10 with the vent holes 31H to open the vent holes 31H, so that vent holes 31H are switched to a discharge state where the gas in the airbag 10 is able to be discharged.

Now, the first discharge-state switching member 31 will be explained below in more detail.

Figure 12:
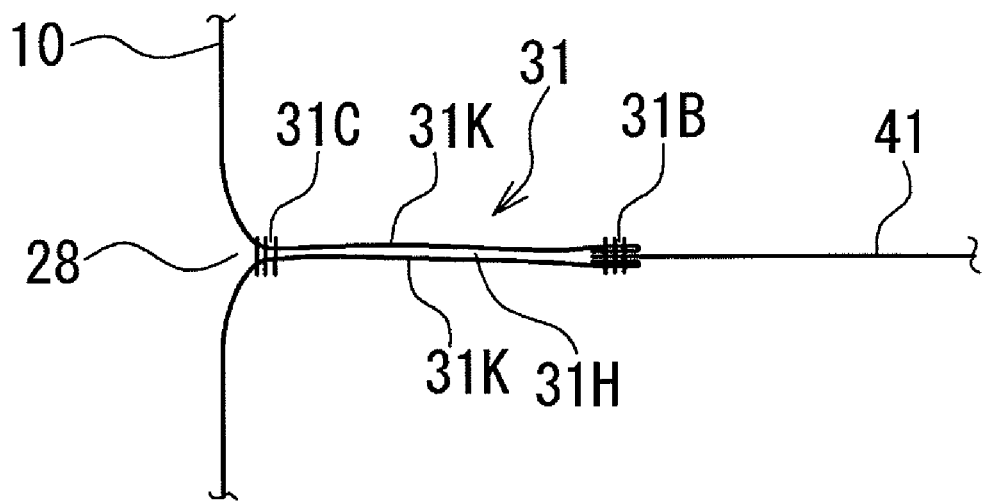
FIG. 12 is a side view schematically showing a discharge-state switching member in a non-discharge state of FIG. 10.
Figure 13:
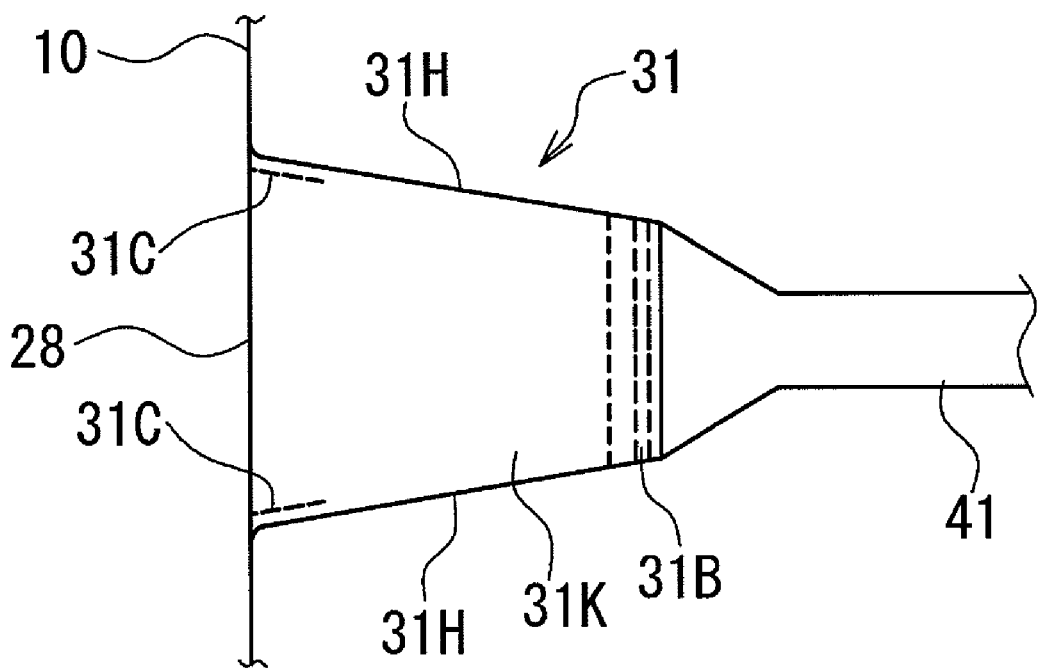
FIG. 13 is a plan view schematically showing the discharge-state switching member in the non-discharge state of FIG. 10.
Figure 14:
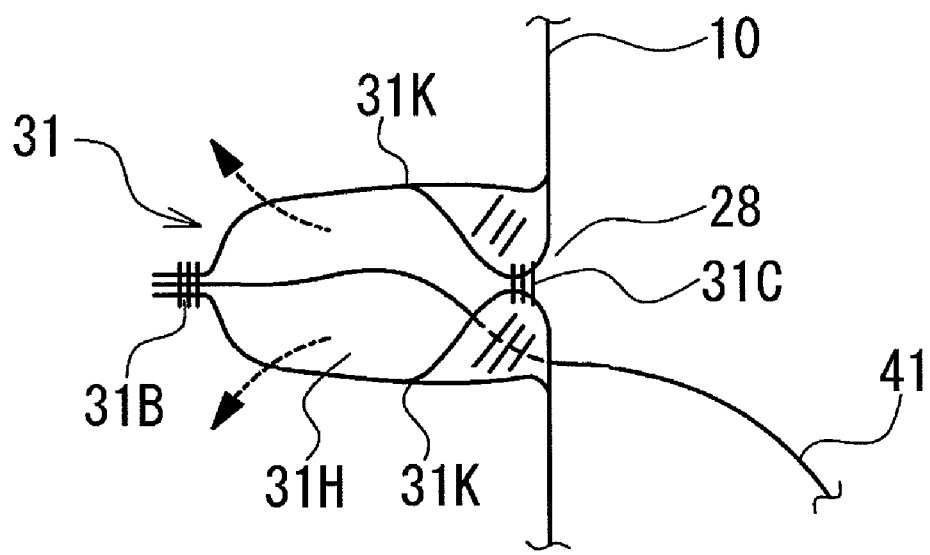
FIG. 14 is a side view schematically showing the discharge-state switching member in a discharge state of FIG. 10.
Figure 15:
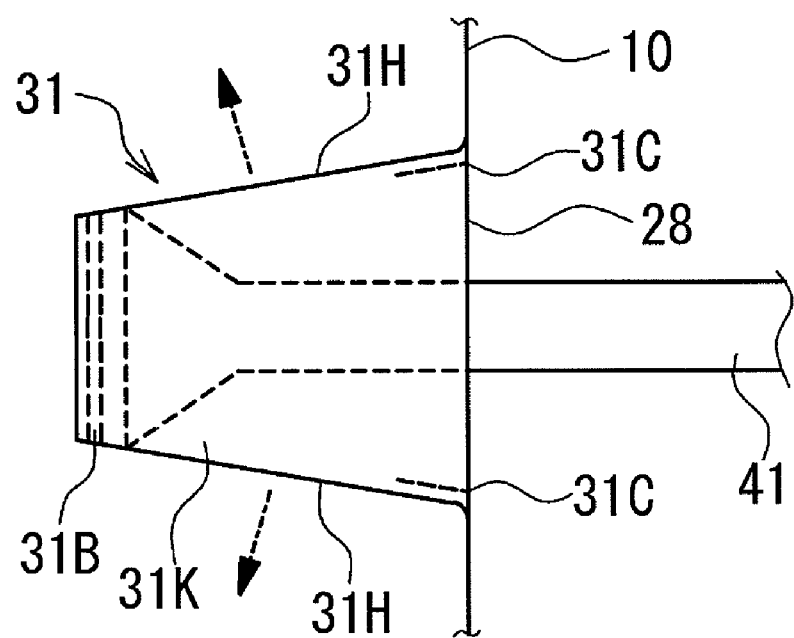
FIG. 15 is a plan view schematically showing the discharge-state switching member in the discharge state of FIG. 10.
Figure 16A:
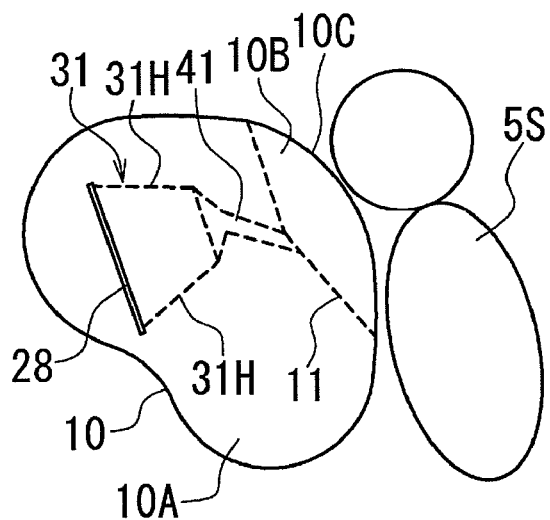
FIG. 16 is a side view schematically showing a state where an airbag device of the second embodiment is activated.
Figure 16B:
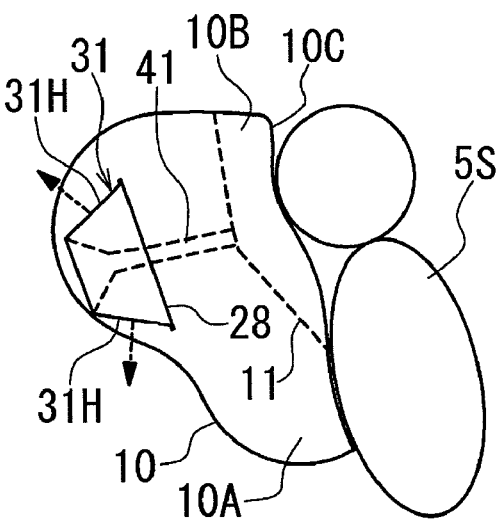
Figure 16C:
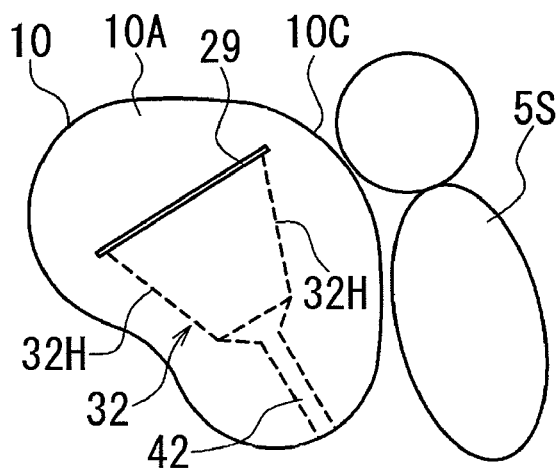
Figure 16D:
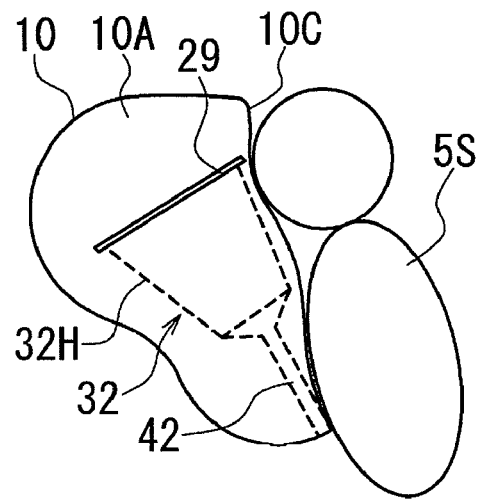

FIGS. 12 and 13 are views schematically showing the first discharge-state switching member 31 in the non-discharge state: FIG. 12 is a side view; and FIG. 13 is a plan view. FIGS. 14 and 15 are views schematically showing the first discharge-state switching member 31 in the discharge state: FIG. 14 is a side view; and FIG. 15 is a plan view.

The first discharge-state switching member 31 has a pair of base fabric pieces 31K that have one end portions surrounding the opening 28 and the other end portions formed by bonding to each other and covering the opening 28, and the openings on both sides between the one end portions and the other end portions define the vent holes 31H. That is, the first discharge-state switching member 31 is, as shown in FIGS. 12 to 15, has a pair of strip members (strip-shaped fabrics) 31K that extend from the first opening 28 of the airbag 10 and are vertically overlapped to each other to cover the first opening 28. The pair of base fabric pieces 31K as a generally trapezoidal shape as laterally seen (see FIGS. 13 and 15) that tapers from one end portion (proximal end portion) on the first opening 28 side to the other end portion (distal end portion), and the distal end portions are bonded to each other together with the distal end portion of the first tether belt 41 generally entirely along the direction of the width (a bonded portion 31B in FIGS. 12 to 15). Both of the side portions are bonded to each other (bonded portions 31C in FIGS. 12 to 15) only at a position near the proximal end portions on the airbag 10 side, and the portions from the bonded portions 31C to the bonded portion 31B of the distal end portions are not bonded to each other to be open (unbonded portions). Therefore, the inside and the outside of the airbag 10 are communicating with each other via the openings (unbonded portions) on the both sides of the pair of the base fabric pieces 31K, and in the present embodiment, the both side portions of the pair of the base fabric pieces 31K surrounding the unbonded portions define the vent holes 31H of the first discharge-state switching member 31.

Because the both side portions of the pair of the base fabric pieces 31K are bonded (the bonded portions 31C) for a predetermined length at a position near the proximal end portions on the airbag 10 side, the vent holes 31H are not continuous to the first opening 28 of the airbag 10, but is separated by the bonded portions 31C. Each of the pair of the base fabric pieces 31K is integrated with airbag 10, by sewing and bonding a pair of base fabrics having a predetermined shape to the through hole of the airbag 10 to surround the periphery of the through hole so as to provide the first opening 28, for example. Alternatively, the base fabric piece 31K may be integral with the lateral portion 10D which has two divided pieces across the first opening 28, which is achieved by cutting (and forming) a fabric piece into two divided pieces for the lateral portion 10D of the airbag 10 with a part corresponding to the base fabric piece 31K, and bonding the divided pieces to each other except the portion for the first opening 28, so that the portion surrounded by one end portion of the pair of base fabric pieces 31K provides the first opening 28, for example.

The first tether belt 41 is a coupling member having a predetermined length for coupling the first discharge-state switching member 31 to the partition wall 11, and in the airbag device 1S, is formed into an elongated generally strip shape having one end (see FIG. 11A) being bonded to the partition wall 11 at the position below the gas passage 22 at the generally central portion of the partition wall 11. The first tether belt 41 is formed into a shape that has the other end portion (see FIGS. 13 and 15) that is coupled (bonded) to the distal end portion of the first discharge-state switching member 31 (the base fabric pieces 31K) and gradually increases the width toward the end edge, and the widths of the bonded end portions are generally equal to each other, so as to pull the entire distal end portion of the first discharge-state switching member 31 to generate a tension, a pulling force, and the like.

The first tether belt 41 promotes the deployment of the second chamber 10B and enables a rapid inflation and deployment of the second chamber 10B by causing the partition wall 11 coupled to one end thereof to apply tension to the first discharge-state switching member 31 coupled to the other end thereof when the airbag 10 deploys (see FIG. 11A), and limiting the movement of the partition wall 11 toward the second chamber 10B. Also, the first tether belt 41 causes the first discharge-state switching member 31 to apply tension to the other end side (the partition wall 11 side) when the airbag 10 inflates and deploys due to the activation of the inflator 2, to close the vent holes 31H (see FIGS. 12 and 13), and also when the inflated and deployed airbag 10 receives the occupant 5S and deforms, depending on the position of the receipt, the first tether belt 41 releases the tension to the first discharge-state switching member 31 to the partition wall 11 side so as to open the vent holes 31H (see FIGS. 14 and 15). In this way, the first tether belt 41 has a function to switch the vent holes 31H of the first discharge-state switching member 31 between a state where the gas in the airbag 10 is discharged and a state of non-discharge, using the tension.

That is, when the inflator 2 is activated and the airbag 10 inflates and deploys (see FIG. 11A), the first tether belt 41 is pulled between the partition wall 11 and the first discharge-state switching member 31 under the inflation and deployment force generated by a gas supply from the inflator 2. The first tether belt 41 is configured to have a length so that, in the above situation, the first tether belt 41 causes the bag-like second chamber 10B to almost completely inflate and deploy, and also draws and pulls the first discharge-state switching member 31 into the airbag 10 (see FIGS. 12 and 13) in a generally straight line against the inner pressure of the airbag 10 to close the vent holes 31H and switch the vent holes 31H to a non-discharge state.

Moreover, during the airbag 10 is inflating also, in accordance with the inflation and deployment, the first tether belt 41 gradually pulls the partition wall 11 coupled to the other end thereof toward the one end thereof using the first discharge-state switching member 31 coupled to the one end thereof, and controls the movement of the partition wall 11 to draw the partition wall 11 into the first chamber 10A, so that the partition wall 11 (the second chamber 10B) is expanded in the first chamber 10A. In the expansion, the first tether belt 41 pulls the generally central portion of the partition wall 11 that protrudes most on the first chamber 10A side when the partition wall 11 completely inflates and deploys, so that the second chamber 10B can inflate generally uniformly toward the first chamber 10A. Also, the first tether belt 41 causes the first discharge-state switching member 31 to apply tension to the partition wall 11 side to close the vent holes 31H and switch the vent holes 31H to the non-discharge state relatively early during the inflation of the airbag 10.

On the contrary, when the inflated and deployed airbag 10 receives an occupant 5S and deforms, the second chamber 10B that maintains the inner pressure deforms to accept the occupant 5S depending on the position of the receipt, and so the second chamber 10B and the partition wall 11 deform into a convex shape to the first chamber 10A side, and also the entire second chamber 10B is urged in the direction the occupant 5S entered, and moves toward the first opening 28. As a result, the inner pressure of the first chamber 10A is gradually increased and the distance between the first opening 28 and the bonding position of the first tether belt 41 to the partition wall 11 in the airbag 10 is decreased, which causes the first tether belt 41 to be loosened between the partition wall 11 and the first discharge-state switching member 31, resulting in the release of the tension to the partition wall 11. The first tether belt 41 is configured to have a length which, in the above situation, allows the first discharge-state switching member 31 to be drawn out of the airbag 10 due to the inner pressure of the airbag 10 (see FIGS. 14 and 15), and the vent holes 31H to be opened and switched to the discharge state.

While the above described first tether belt 41 is coupled to the partition wall 11 at one end thereof (see FIG. 11A), the second tether belt 42 is directly coupled to the first chamber 10A of the airbag 10 at one end thereof.

The second tether belt 42 has, as shown in FIG. 11B, one end coupled to a lower position below the second chamber 10B (the partition wall 11) of the airbag 10 in an inflated and deployed configuration (the first chamber 10A) by bonding for example, and the other end coupled to the second discharge-state switching member 32 at the second opening 29. The second tether belt 42 is a coupling member having a predetermined length for coupling the second discharge-state switching member 32 to a predetermined position on the airbag 10, and is formed into an elongated generally strip shape for example, as in the case with the above described first tether belt 41. The second discharge-state switching member 32 is also configured similarly to the first discharge-state switching member 31 (see FIGS. 12 to 15), and includes a pair of base fabric pieces 32K that extend from the second opening 29 that is provided similarly to the first opening 28 to provide vent holes 32H at the both side openings for example, and the distal end portions of the pair of base fabric pieces 32K are bonded to each other together with the distal end portion of the second tether belt 42.

The second opening 29 is, however, provided in the other lateral portion 10D (front side in the plane of FIG. 10) which is the opposite to the lateral portion 10D of the airbag 10 in an inflated and deployed configuration where the first opening 28 is provided. Also, the second opening 29 is provided at a position relatively close to the gas inlet port 20 of the lateral portion 10D away from the coupling position of the second tether belt 42 to the airbag 10 at an oblique angle in a straight line. Moreover, the discharge-state switching member 31 with the tether belt 41 and the discharge-state switching member 32 with the tether belt 42 that extend from the first and second openings 28 and 29 respectively are arranged with a space therebetween to extend in different directions in the inflated and deployed airbag 10.

The second tether belt 42 is configured to have a length so that, in the above coupled situation, the second tether belt 42 causes the second discharge-state switching member 32 to apply tension to the other end portion thereof (the lower side of the airbag 10), and also draws and pulls the second discharge-state switching member 32 into the airbag 10 (see FIGS. 12 and 13) against the inner pressure of the airbag 10 in a generally straight line to close the vent holes 32H and switch the vent holes 32H to a non-discharge state. Moreover, during the airbag 10 is inflating also, in accordance with the inflation and deployment, the second tether belt 42 causes the second discharge-state switching member 32 to apply tension to the other end portion thereof to close the vent holes 32H and switch the vent holes 30H to the non-discharge state relatively early during the inflation of the airbag 10.

On the contrary, when the inflated and deployed airbag 10 receives an occupant 5P in OOP, the airbag 10 (the lower portion in the present embodiment) deforms into a convex shape into the first chamber 10A, which causes the inner pressure of the first chamber 10A to gradually increase, and the second tether belt 42 to be loosened. The second tether belt 42 is configured, in the situation, to release the tension to the second discharge-state switching member 32 so as to open the vent holes 32H (see FIGS. 14 and 15), and as the result of that, due to the inner pressure of the airbag 10, the second discharge-state switching member 32 is drawn out of the airbag 10 and the vent holes 32H are switched to the discharge state.

In the present embodiment, the second tether belt 42 is coupled to the airbag 10 at a position where the occupant 5P in OOP who is mainly seated in a position relatively largely different from the normal position enters. That is, the second tether belt 42 is coupled at a position where the tension by the second tether belt 42 is released and the second discharge-state switching member 32 can be switched to the discharge state when the occupant 5P contacts the position relatively far from the normal contact position and enters around the lower portion of the airbag 10: for example in a case where a small occupant 5P such as a child is approaching or touching an instrument panel. The coupled position of the second tether belt 42 is set for example within a range where dummies of a six-year-old child, a three-year-old child, and a twelve-month-old infant in test positions 1 and 2 contact the activated airbag 10 and the second discharge-state switching member 32 is switched to the discharge state, with the dummies being in contact with an instrument panel at their head or chest, as defined by the Federal Motor Vehicle Safety Standards FMVSS208; for example, a lower position (bottom portion) of the airbag 10 in an inflated and deployed configuration which is close to the instrument panel.

Next, the functions of each portion when the above described airbag device 1S is operated will be explained below.

FIGS. 16 and 17 are side views schematically showing the operated airbag device 1S: FIG. 16 shows an example with the occupant 5S seated mainly in the normal position; and FIG. 17 shows an example with the occupant 5P in the above described OOP.

The airbag device 1S is installed at a predetermined position (in an instrument panel or the like) in front of a passenger seat of a vehicle, and in the situation, the airbag 10 is folded in a predetermined manner with the discharge-state switching members 31 and 32 incorporated therein. In a vehicle collision or the like, the airbag device 1S activates the inflator 2 (see FIG. 10) to cause the first chamber 10A and the second chamber 10B of the airbag 10 to inflate and deploy, so that the entire airbag 10 inflates and deploys.

As the airbag 10 inflates and deploys, the first tether belt 41 is gradually pulled by the first discharge-state switching member 31 to control the movement of the partition wall 11, and assist the inflation of the second chamber 10B, which promotes the inflation of the second chamber 10B and progresses the inflation and deployment of the airbag 10. At the same time, the second tether belt 42 is pulled between coupled portions, and a large tension is applied to the discharge-state switching members 31 and 32 in the airbag 10 that are coupled to the tether belts 41 and 42 respectively, and as the result of that the vent holes 31H and 32H are substantially closed (see FIGS. 12 and 13) and the openings 28 and 29 are blocked in the airbag 10. The non-discharge state is maintained by the tension of the tether belts 41 and 42 to suppress any discharge of the gas from the airbag 10 and decrease possible gas leak for a rapid inflation and deployment of the airbag 10. When the airbag 10 and the second chamber 10B substantially inflate and deploy, the discharge-state switching members 31 and 32 are pulled tight in the direction toward the inside of the airbag 10 by the tether belts 41 and 42. The large tension allows the discharge-state switching members 31 and 32 to be maintained in the non-discharge state without fail against the inner pressure of the airbag 10.

In the situation (see FIG. 16A), when the occupant 5S moves forward due to the impact of a vehicle collision and contacts the front portion 10C of the airbag 10 (see FIG. 16B), the airbag 10 (the second chamber 10B) receives the occupant 5S, and the entire inflated and deployed airbag 10 deforms mainly in the direction the occupant 5S entered. In the deformation, the second chamber 10B deforms into a concave shape to accept the occupant 5S, but the check valve 25 prevents any gas flow from the inside, which maintains the deformed concave shape to restrain the occupant 5S without fail. At the same time, the gas is compressed and the inner pressure is increased in the first chamber 10A, and also the entire second chamber 10B moves in the direction the occupant entered (toward the opening 28), and the partition wall 11 deforms into a convex shape, which causes the first tether belt 41 to be loosened, resulting in the release of the tension applied to the discharge-state switching member 30 toward the partition wall 11. As a result, the first discharge-state switching member 31 is urged by the inner pressure of the first chamber 10A and drawn out of the airbag 10 due to the inner pressure of the first chamber 10A (see FIGS. 14 and 15), thereby the vent holes 31H are opened for communication between the inside and the outside of the first chamber 10A. As described above, switched from the non-discharge state (see FIG. 16A) to the discharge state (see FIG. 16B), the first discharge-state switching member 31 discharges the gas in the first chamber 10A through the first opening 28, the first discharge-state switching member 31, and the vent holes 31H to the outside. This makes the first chamber 10A gradually shrunk to accept and protect the occupant 5S softly in the airbag 10 while absorbing and reducing the impact in the collision to the occupant 5S.

If the occupant 5S is seated in an abnormal posture by leaning forward for example, and contacts the airbag 10 earlier than usual, the airbag 10 is brought in contact with the occupant 5S before the airbag 10 completely inflates, and a further inflation and deployment is disturbed. However, in such a case also, the gas can be discharged through the vent holes 31H because, in the airbag 10, the inner pressure of the first chamber 10A is increased with the first tether belt 41 being loosened, and the first discharge-state switching member 31 is urged out of the first chamber 10A by the inner pressure and is switched to the discharge state. The second tether belt 42 (see FIG. 16C) is coupled to a lower position on the airbag 10, and is maintained under a tension even when the airbag 10 deforms (see FIG. 16D) due to the entrance by the occupant 5S. Therefore, the second discharge-state switching member 32 coupled to the second tether belt 42 is maintained in the non-discharge state, which prevents or suppresses the gas discharged through the vent holes 32H and the second opening 29.

On the contrary, when the above described occupant 5P in OOP contacts around the lower portion of the inflated and deployed airbag 10 where the second tether belt 42 is coupled (see FIG. 17A), the airbag 10 upwardly deforms to receive and accept the occupant 5P therein. Then, the gas is compressed and the inner pressure is increased in the first chamber 10A, and also the entire second chamber 10B moves in the direction the occupant entered (toward the opening 23), and the tether belt 42 is loosened, resulting in the release of the tension applied to the second discharge-state switching member 32. As a result, the second discharge-state switching member 32 is drawn out of the airbag 10 (see FIGS. 14 and 15) and switched from the non-discharge state to the discharge state, thereby the vent holes 32H are opened for communication between the inside and the outside of the first chamber 10A, so that the gas in the first chamber 10A is discharged through the second opening 29 and the vent holes 32H to the outside. As described above, this allows the entering occupant 5P to be restrained by the airbag 10, and makes the first chamber 10A gradually shrunk to accept and protect the occupant 5P softly in the airbag 10 while absorbing and reducing the impact in the collision to the occupant 5P.

The occupant 5P is protected by the second discharge-state switching member 32 not only after the airbag 10 completely inflated, but also when the occupant 5P contacts the airbag 10 that is still inflating and deploying, as in the case with the above described first discharge-state switching member 31. Moreover, because the first tether belt 41 (see FIG. 17B) remained under tension even after such an occupant 5P enters the airbag 10 and the airbag 10 deforms, the first discharge-state switching member 31 coupled to the first tether belt 41 is maintained in the non-discharge state, thereby the gas discharged through the vent holes 31H and the first opening 28 is prevented or suppressed.

As explained above, the airbag device 1S of the second embodiment provides the same effects to the occupant 5S as those explained in the first embodiment, and also improves the protective function for the occupant 5P in the state of OOP. That is, in the present embodiment, the openings 28 and 29 are provided at positions that do not readily permit a gas flow therethrough during the inflation of the airbag 10, and the discharge-state switching members 31 and 32 are maintained in the non-discharge state to suppress the gas discharge from the inflated airbag 10 during the inflation, which allows the airbag 10 to rapidly inflate and deploy. As a result, the airbag 10 is able to provide an adequate restraining force to the occupant 5S or 5P at an early state of the inflation, thereby the occupant 5S or 5P can be protected, even if not only the occupant 5P in OOP (see FIG. 17A) but also the occupant 5S seated in a normal position (see FIG. 16) approach the airbag device 1S or lean forward from the normal position, and contacts the airbag 10 earlier than usual, for example.

In the airbag device 1S, a gas easily flows through the gas passage 22 of the partition wall 11 toward the second chamber 10B, and the first tether belt 41 allows the second chamber 10B to more early and more reliably inflate and deploy. Also, the tether belt 41 enables the control of an outgoing distance and an outgoing pressure of the partition wall 11 (the second chamber 10B) toward the occupant 5S when the airbag 10 inflates, which improves the deployment property and protective function for occupant 5S of the airbag 10. Moreover, the airbag device 1S has the check valve 25 at the gas passage 22 in the partition wall 11, thereby even after the inflated and deployed second chamber 10B receives the head and the like of the occupant 5S, the inner pressure is maintained so that the deformation of the second chamber 10B is kept and the movement of the occupant's head and the like after collision can be further limited, which improves the restraining force of the second chamber 10B for the occupant 5S where the occupant 5S most probably enters.

Also, in the airbag device 1S, as described above, when the inflated and deployed airbag 10 receives the occupant 5S or 5P who contacts and enters the airbag 10, and deforms, depending on the position of the receipt, the tension applied to the first discharge-state switching member 31 or the second discharge-state switching member 32 is released to open the vent holes 31H or 32H, thereby in spite of the contact position with the occupant 5S or 5P, the airbag 10 (the first chamber 10A) discharges the gas without fail, and protects the occupant 5S or 5P safely. That is, the most general occupant 5S who contacts the front portion 10C of the airbag 10 (see FIG. 16B) is restrained and protected by the second chamber 10B without fail because of the gas discharge through the first discharge-state switching member 31, and the occupant 5P in OOP (see FIG. 17A) who contacts the lower portion of the airbag 10 is protected because of the gas discharge through the second discharge-state switching member 32.

In the discharge states, in the airbag device 1S, the discharge-state switching members 31 and 32 are operated independently of each other, and only one of the members 31 and 32 is in the discharge state at a time, thereby an excess discharge of the gas from the airbag 10 can be prevented, and the discharge-state switching members 31 and 32 can be optimized in accordance with each application. For example, the vent holes 31H and 32H of the discharge-state switching members 31 and 32 may have different sizes, or may be arranged in different positions in the airbag 10, or the tether belts 41 and 42 may have different lengths from each other, so that the vent holes 31H or 32H are opened at the most appropriate timing, or the amount of discharged gas is optimized to operate the discharge-state switching member 31 or 32 in the most appropriate manner to the application. Particularly, the second discharge-state switching member 32 for protection of child or the like requires a larger amount of discharged gas, but the airbag device 1S causes no problem even if the vent holes 32H have a larger size (for example, about five times larger) than usual.

The discharge-state switching members 31 and 32 are arranged at the openings 28 and 29 at the lateral portions 10D of the airbag 10, respectively, and even when shifted to the discharge state, the discharge-state switching members 31 and 32 can be drawn out of the airbag 10 without any interference with a front glass or an in-dash panel of a vehicle, resulting in a stable discharge of the gas. Also, the openings 28 and 29 are arranged to the lateral portions 10D of the airbag 10 individually, and the discharge-state switching member 31 with the tether belt 41 and or the discharge-state switching member 32 with the tether belt 42 are arranged with a space therebetween, thereby any interference with each other is prevented, which enables more stable gas discharges, and smooth and ensured operations.

Furthermore, the airbag device 1S has the openings 28 and 29 provided at positions away from the bonding position between the second chamber 10B and the second tether belt 42 where the occupant 5S or 5P contacts the airbag 10, thereby the discharge-state switching members 31 and 32 are unlikely to be affected by the deformation of the airbag 10 due to the entrance by the occupant 5S or 5P, and are drawn out of the airbag 10 (switched to the discharge state) without fail. As a result, a large amount of gas can be stably discharged from the first chamber 10A without fail, that is, a sufficient amount of gas discharged from the airbag 10 is ensured, which improves the impact absorbing capability of the airbag 10. Also, even when the occupant 5S or 5P is received during the inflation and deployment of the airbag 10, the gas discharge from the first chamber 10A can be achieved, which reduces the impact to the occupant 5S or 5P in such a situation.

As for the first tether belt 41, because the one end is attached to the partition wall 11 that defines the second chamber 10B, in spite of the position on the second chamber 10B of the airbag 10 where the occupant 5S contacts, the entire second chamber 10B moves toward the first opening 28, or the partition wall 11 deforms into a convex shape due to the deformation of the second chamber 10B, which loosens the first tether belt 41. As a result, regardless of the position where the occupant 5S is received, the discharge state of the first discharge-state switching member 31 can be switched, and the responsibility in collision can be improved.

In addition, in the discharge-state switching members 31 and 32 in the non-discharge state, as in the above description, the proximal end portions (mainly the periphery portion between the both bonded portions 31C) on the airbag 10 side of the vent holes 31H and 32H function as a kind of valves, which ensures the suppression of the gas discharge in the non-discharge state. Also, because the discharge-state switching members 31 and 32 are pulled at the generally entire distal end portions thereof by the tether belts 41 and 42 respectively, which stabilizes the postures of the discharge-state switching members 31 and 32 in the airbag 10, and the non-discharge state can be reliably and stably maintained.

Therefore, according to the airbag device 1S of the present embodiment, an enhanced occupant restraining force of the airbag 10 in a vehicle collision or the like for the occupants 5S and 5P is provided, and an occupant's head is more reliably restrained to more reliably limit the movement of the occupants 5S and 5P in the collision. The discharge-state switching members 31 and 32 enable the gas discharge from the airbag 10 in a certain and adequate manner even when the occupant 5P in OOP contacts the airbag 10 as well as when the occupant 5S in the general position contacts the airbag 10, which reduces the impact to the occupants 5S and 5P, and effectively improves the protective function of the airbag device 1 to the occupants 5S and 5P. This is particularly effective in the case where the second chamber 10B functions as a head restraining portion of the airbag 10 for restraining the head of the occupant 5S that has a higher need for protection.

Moreover, the airbag 10 requires a relatively small number of components in manufacturing, and has a relatively simple configuration: for example, the discharge-state switching members 31 and 32 can be realized by a relatively simple structure that is provided by mutually bonding the end portions of the pair of base fabric pieces 31K and 32K extending from openings 28 and 29, respectively, and providing the both side openings to define the vent holes 31H and 32H. In this way, the airbag 10 of the present embodiment has a simple configuration and a simple structure for the functions, which prevents any degradation of workability and productivity in manufacturing such as sewing, and enables the manufacturing of the airbag 10 at a lower cost.

As described above, the lengths of the tether belts 41 and 42 may vary to some degree. In addition to the sizes of the openings 28 and 29 and the discharge-state switching members 31 and 32 (the vent holes 31H and 32H) in the above described airbag 10, the configurations including the size of the gas passage 22 of the partition wall 11 may be appropriately set individually, depending on the configurations of the airbag 10 and the partition wall 11 (the second chamber 10B), the inflation and discharge pattern including a discharge rate required to the airbag 10.

Furthermore, the openings 28 and 29 of the airbag 10 may have different configurations, and may be extended in different directions from those of the present embodiment for example according to the aspects including the directions in which the discharge-state switching members 31 and 32 are arranged and the positions at which the tether belts 41 and 42 are coupled. Also, in the airbag 10, the vent holes 31H and 32H are only provided to the discharge-state switching members 31 and 32, but another vent holes may be provided on the first chamber 10A side, such as hole-shaped vent holes on the front glass side of the airbag 10 in an inflated and deployed configuration (the first chamber 10A). The discharge-state switching members 31 and 32 may be folded at positions outside of the airbag 10 with the airbag 10, before the airbag device 1S is activated.

In the present embodiment, the openings 28 and 29 and the discharge-state switching members 31 and 32 of the airbag 10 may be may be arranged in different positions on the first chamber 10A side in the airbag 10, as long as the discharge-state switching members 31 and 32 are switched to the discharge state and the discharge of the gas is not disturbed when the airbag 10 after or during inflation receives the occupant 5S or 5P. For example, the openings 28 and 29 and the discharge-state switching members 31 and 32 may be arranged at the same lateral portion 10D together, the upper portion, or the like on the first chamber 10A side of the airbag 10 in an inflated and deployed configuration. Similar to the discharge-state switching member 30 of the first embodiment, the discharge-state switching members 31 and 32 (the base fabric pieces 31K and 32K) may have larger widths than the widths of the openings 28 and 29 of the airbag 10, respectively.

Similarly, the first tether belt 41 may be attached at different positions from those in the present embodiment on the partition wall 11 and the distal end portion of the first discharge-state switching member 31 at the both end portions thereof, as long as the discharge states of the first discharge-state switching member 31 can be switched and the movement of the partition wall 11 can be limited. The same can be applied to the attachment position of the second tether belt 42 to the second discharge-state switching member 32. That is, the first tether belt 41 and the second tether belt 42 may be attached at another positions as long as the distances between the positions of the openings 28 and 29 and the position where the first tether belt 41 is attached to the partition wall 11 and the position where the second tether belt 42 is attached to the airbag 10 respectively are reduced when the inflated and deployed airbag 10 receives the occupant 5S or 5P.

Moreover, in the present embodiment, the second tether belt 42 is directly coupled to the airbag 10 at a position at the lower portion (the bottom portion) of the airbag 10, but may be indirectly coupled to the airbag 10 by dividing the first chamber 10A of the airbag 10 to define a third chamber below the second chamber 10B and bonding the second tether belt 42 to a partition wall defining the third chamber. That is, a smaller chamber may be defined around the bonding position of the second tether belt 42 to the airbag 10 (the first chamber 10A), so that the second discharge-state switching member 32 is coupled to the smaller chamber via the second tether belt 42.

Figure 17A:
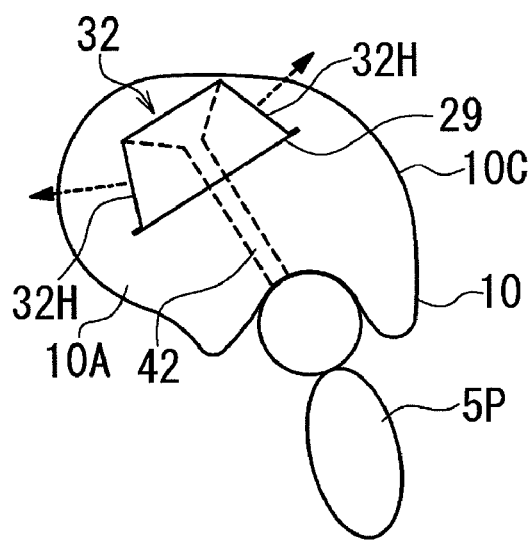
FIG. 17 is a side view schematically showing a state where an airbag device of the second embodiment is activated.
Figure 17B:
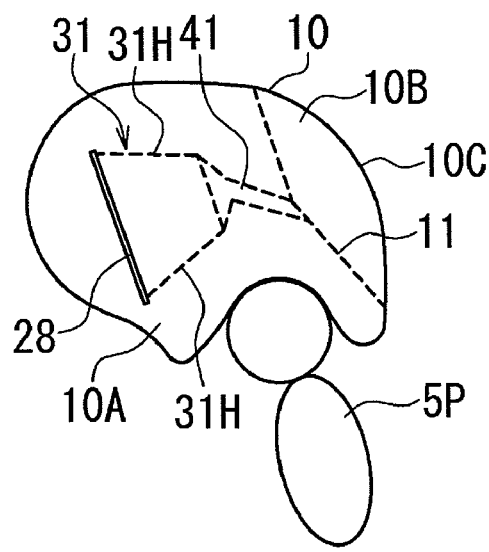

FIG. 18 is a side view schematically showing an example of the airbag device 1S having the smaller chamber, and shows only the member coupled to the second tether belt 42 corresponding to FIG. 17A.

Figure 18A:
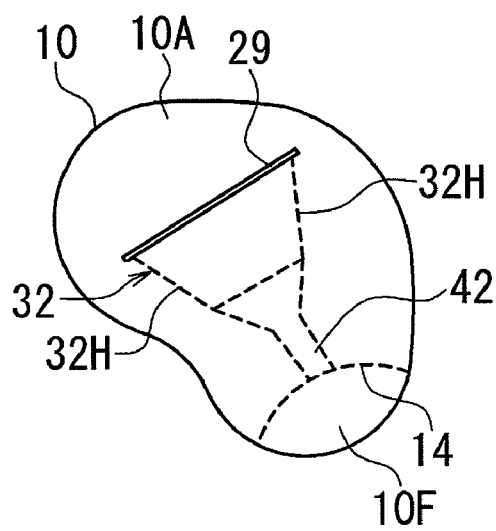
FIG. 18 is a side view schematically showing another example of an airbag device of the second embodiment.

In the airbag device 1S, as shown in FIG. 18A, the smaller chamber (the third chamber) 10F that includes at least the bottom portion of the airbag 10 is formed by bonding a second partition wall 14 to a position below the second chamber 10B (the partition wall 11) of the airbag 10 (see FIG. 10), and separating the lower portion of the first chamber 10A of the airbag 10 in an inflated and deployed configuration below the second chamber 10B (the partition wall 11) from the first chamber 10A. The second partition wall 14 is configured similarly to the partition wall 11, and includes a gas passage for a gas flow between the first chamber 10A and the third chamber 10F and a check valve for example, and is arranged at the lower portion of the airbag 10 so that the third chamber 10F is within the range where the occupant 5P in OOP contacts and enters. The second tether belt 42 is coupled to the approximately central position of the second partition wall 14 at one end thereof, and similar to the first tether belt 41, limits the movement of the second partition wall 14 toward the third chamber 10F when the airbag 10 inflates to promote the inflation and deployment of the third chamber 10F, and causes the second discharge-state switching member 32 that is coupled to the other end thereof to apply tension to the second partition wall 14.

Figure 18B:
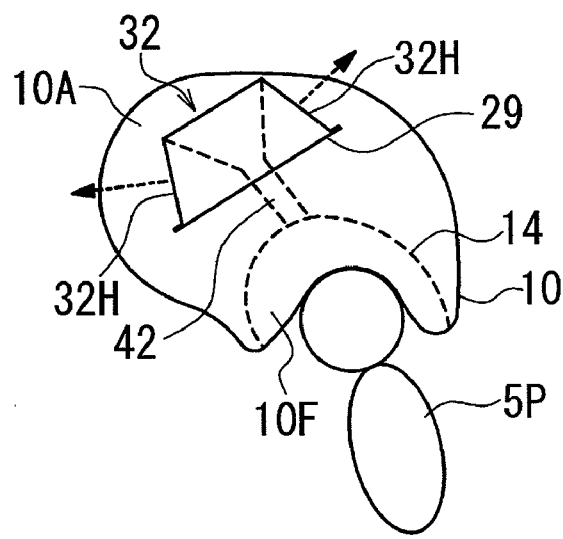
Figure 22:
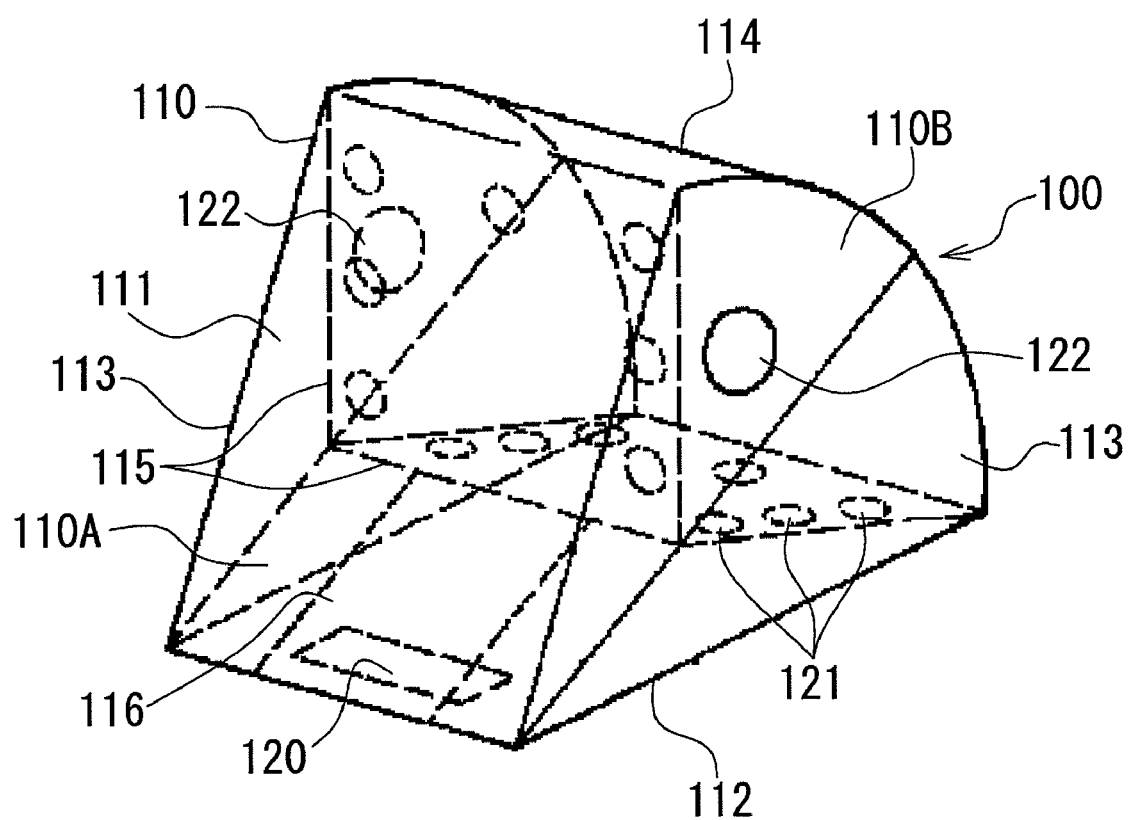
FIG. 22 is a perspective view showing a conventional airbag device with an inflated and deployed airbag.

The airbag device 1S provides, in addition to the above described effects, the same effects as those of the second chamber 10B when the occupant 5P in OOP contacts and enters the third chamber 10F of the inflated and deployed airbag 10. That is, as shown in FIG. 18B, the third chamber 10F that maintains the inner pressure receives the occupant 5P who entered therein, which increases the restraining force of the airbag 10 to the occupant 5P, and the occupant 5P can be more reliably restrained and protected. Wherever the occupant 5P contacts the third chamber 10F of the airbag 10, the entire third chamber 10F moves toward the opening 29, or the partition wall 14 deforms upward due to the deformation of the third chamber 10F so as to loosen the tether belt 42. As the result, regardless the position where the occupant 5P is received, the discharge state of the discharge-state switching member 32 can be switched, and the responsibility in collision can be improved.

Third Embodiment

Next, a third embodiment of an airbag device according to the present invention will be explained below.

FIG. 19A is a plan view showing a first side panel member 80A and a second side panel member 80B of an airbag according to the third embodiment.

The airbag 10 of the present embodiment is configured with a center panel (FIG. 20) which will be explained later, and a pair of side panels 80 constituting the lateral portions 10D of the airbag 10, and a switch-vent hole mechanism is provided at an appropriate position on the side panels 80 to achieve gas discharge in a lateral direction of the airbag 10, that is, in a direction orthogonal to an occupant.

The side panels 80 are members sewn to the circumference (the outer periphery) of the center panel to define the side shape of the inflated and deployed airbag 10, and are configured with first and second side panel members 80A and 80B with base fabric pieces (flap members) constituting the above described discharge-state switching members (flaps), so that the switch-vent hole mechanism can be provided by the bonding of the base fabric pieces.

That is, as shown in FIG. 19A, the first and second side panel members 80A and 80B, when assembled to each other, are configured with the curved outer peripheral portions 88A and 88B that define the series of outer contour of the inflated and deployed airbag 10, first straight portions 86A and 86b that are overlapped to each other and inwardly notched from the both ends thereof with a portion having a predetermined length left between the ends, and oblique-side portions 84A and 84B that extend to form a generally trapezoidal shape in a plan view that has a tapered width from the inner ends of the straight portions 86A and 86b toward distal second straight portions (upper-side portions) 82A and 82B.

The first straight portions 86A and 86B, the oblique-side portions 84A and 84B, and the distal second straight portions 82A and 82B of the first and second side panel members 80A and 80B have the same shape and length correspondingly, and the curved outer peripheral portions 88A and 88B may have any shapes and lengths individually in accordance with a developed configuration of the airbag 10.

The first and second side panel members 80A and 80B provide a discharge-state switching member F by folding back one of the trapezoidal portions, that is, the base fabric pieces FA and FB, and integrating the first straight portions 86A and 86B and the second straight portions 82A and 82B respectively by sewing for example.

FIG. 19B shows the side panel 80 formed by bonding the first and second side panel members 80A and 80B as described above. The panel section between the first straight portions 86A and 86b is not bonded, which provides an opening for communication between the inside and the outside of the airbag 10 when the airbag 10 is provided by bonding the side panel 80 along the circumference (outer periphery) of a center panel 90 (FIG. 20) which will be explained later, and oblique-side portions 84A and 84B that are also not bonded provide vent holes communicating with the opening.

That is, when an occupant enters the airbag 10, the discharge-state switching member F is urged to the outside of the airbag 10, and the gas through the opening is discharged outside of the airbag 10 through the portions between the oblique-side portions 84A and 84B. Therefore, the portions between the oblique-side portions 84A and 84B of the discharge-state switching member F provide the vent holes for the gas flow, and the gas that flew in through the opening is ejected through the portions between the unbonded oblique-side portions 84A and 84B of the generally trapezoidal shape in a plan view of the discharge-state switching member F. In other words, in the airbag 10 of the present embodiment, the bonding between the first and second side panel members 80A and 80B provides an opening at a position corresponding to the longer side of the above described trapezoidal portion, and also the vent holes at the oblique-side portions 84A and 84B.

The vent holes may be provided only one or both of the side panels 80 of the airbag 10, FIG. 20 is a developed plan view of a center panel 90.

The center panel 90 is configured with a relatively long first rectangular portion 92 on the left in FIG. 20, a central portion 96 adjacent to the first rectangular portion 92 that has outwardly curved sides, and a relatively short second rectangular portion 94 on the right in FIG. 2.

In the present embodiment, the central portion 96 has a dual structure with a panel 96 (1) for the partition wall that divides the inner space of the airbag 10, and a panel 96 (2) for the outer surface of the airbag 10 when the airbag 10 is assembled. The panel 96 (1) for partition wall is attached with one end of a tether belt 98 that is a coupling member by sewing for example, and on the right of the tether belt 98 in FIG. 20, a gas passage (vent channel) 95 with a check valve (not shown) is provided so that gas flows into the second chamber 10B when the second chamber 10B divided by the panels 96 (1) and 96 (2) is provided. The first rectangular portion 92 includes a gas inlet port 92A provided therein for gas flow from the inflator into the airbag 10.

FIG. 21 is a side view illustrating a process for assembling the side panels 80 having the above described discharge-state switching member F and the center panel 90.

First, as shown in FIG. 21A, the side panels 80 are bonded to the center panel 90 along the edges (outer peripheries), and the ends (free end portions) of the first and second rectangular portions 92 and 94 of the center panel 90 are bonded to each other at by sewing for example.

Then, the bonded side panels 80 and the center panel 90 are turned inside out, as shown in FIG. 21B.

Finally, as shown in FIG. 21C, the other end of the tether belt 98 the one end of which is attached to the central portion of the panel 96 (1) constituting a partition wall is integrated to the shorter side, that is, the free end, the second straight portion 82 of the trapezoid of the discharge-state switching member F on the first chamber 10A side by sewing for example, which completes the assemble of the airbag 10.

As explained above, in the present embodiment, the second chamber 10B is defined between the base fabric pieces by placing the panel of the central portion 96 of the center panel 90, that is, a base fabric piece for partition wall 96 (1) onto a base fabric piece for panel 96 (2) that provides the outer surface of the airbag 10, and bonding the pieces to each other at predetermined positions. The partition wall 96 (1) has a gas passage 95 at the generally central portion thereof that allows gas to flow between the first chamber 10A and the second chamber 10B, and a check valve (not shown) that controls the gas flow in the same manner.

The partition wall 96 (1) may be formed and arranged depending on the application and shape of the airbag device so that the defined second chamber 10B of the airbag 10 is able to receive and restrain an entering occupant in a vehicle collision. That is, the partition wall 96 (1) is formed to have an appropriate size and shape depending on the body part of an occupant to restrain (head and chest in the present embodiment) and the size and inflated and deployed configuration of the entire airbag 10 so that the inflated and deployed second chamber 10B has a size and shape that enable the application of an adequate restraining force to an occupant not seated in a normal position or an occupant who cannot be in the normal position such as a child, and is arranged at a position that enables a safe receipt of the occupant.

The tether belt 98 causes the partition wall 96 (1) coupled to one end thereof to apply tension to the discharge-state switching member F coupled to the other end thereof when the airbag 10 inflates, to promote the inflation and progress the inflation and deployment of the second chamber 10B. Also, the tether belt 98 causes the discharge-state switching member F to apply tension to the partition wall 96 (1) when the inflator is activated and the airbag 10 inflates and deploys to close the vent holes, and when the inflated and deployed airbag 10 receives an entering occupant and deforms, the tether belt 98 releases tension to the discharge-state switching member F toward partition wall 96 (1) to open the vent hole.

During the airbag 10 is inflating also, in accordance with the inflation and deployment, the tether belt 98 gradually pulls the partition wall 96 (1) coupled to the other end thereof toward the discharge-state switching member F using the discharge-state switching member F coupled to the one end thereof to draw the partition wall 96 (1) into the first chamber 10A, so that the partition wall 96 (1) (the second chamber 10B) is expanded in the first chamber 10A. In the expansion, preferably the tether belt 98 pulls the generally central portion of the partition wall 96 (1) that protrudes most on the first chamber 10A side when the partition wall 96 (1) completely inflates and deploys, so that the second chamber 10B can inflate generally uniformly toward the first chamber 10A. Also, the tether belt 98 causes the discharge-state switching member F to apply tension toward the partition wall 96 (1) side to close the vent holes and switch the vent holes to the non-discharge state relatively early during the inflation of the airbag 10.

In airbag 10 configured as described above with a switch-vent hole mechanism, as in the case with the above first and second embodiments, when an occupant enters the inflating and deploying airbag 10, the airbag 10 deforms and the tether belt 98 is loosened, which causes the discharge-state switching member 98 to be drawn out of the airbag 10 due to the inner pressure, and also the portions between the oblique-side portions 84A and 84B (vent hole) are opened for a rapid gas discharge. The rapid gas discharge reduces the impact to the occupant who enters the inflating and deploying airbag 10, and improves the safety of the airbag 10 even when the occupant is not wearing a seat belt, or not seated in a normal position.

In the present embodiment, the switch-vent hole mechanism integrated with the airbag 10 enables the reduction of the number of components and a simplified assembly of the components, resulting in a cost reduction in manufacturing.

In the above description, the first and second panel members are side panel members to be bonded to the center panel, but the center panel may be omitted. Panels that are individually formed by combining the first and second panel members may be bonded to each other, or the first and second panel members may be bonded to another side panel, that is, a side panel without a switch-vent hole mechanism to provide the airbag 10. Also, the other end of the above described tether belt may be bonded to an inner surface of the airbag 10 on an occupant side as in the second embodiment.

What is claimed is:

1. An airbag device comprising an airbag inflatable and deployable by gas and an inflator supplying the gas to the airbag, the improvement comprising:
    a partition wall dividing the inside of the airbag into a first chamber on the inflator side and a second chamber on the occupant side and having a gas passage which enables the gas to flow between the first chamber and the second chamber;
    a discharge-state switching member on the first chamber side of the airbag, the discharge-state switching member having vent holes for discharging the gas from the airbag and capable of switching the vent holes between a discharge state discharging the gas from the airbag and a non-discharge state not discharging the gas from the airbag; and
    a coupling member coupled to the discharge-state switching member at one end thereof and to the partition wall at the other end thereof, the coupling member limiting a movement of the partition wall toward the second chamber and allowing the second chamber to inflate and deploy when the airbag inflates, wherein
    when the inflator is activated and when the airbag inflates and deploys, the coupling member causes the discharge-state switching member to apply tension to the partition wall side to close the vent holes, and when the inflated and deployed airbag receives an entering occupant and deforms, the coupling member releases the tension to the discharge-state switching member toward the partition wall side to open the vent holes.

2. The airbag device according to claim 1, wherein
    the discharge-state switching member has a pair of strip members, an end portion of each of the pair of strip members are attached to an opening in the airbag, and other end portions of the pair of strip members are bonded to each other to cover the opening, whereby openings on both sides between the end portions and the other end portions of the pair of strip members define the vent holes.

3. The airbag device according to claim 1, wherein
    the discharge-state switching member has a pair of base fabric pieces having end portions surrounding the opening in the airbag and other end portions that are bonded to each other and cover the opening, whereby openings on both sides between the end portions and the other end portions of the pair of base fabric pieces define the vent holes.

4. The airbag device according to claim 1, wherein
the discharge-state switching member with the vent holes is drawn out of the airbag and opens the vent holes in the discharge state, and the discharge-state switching member with the vent holes is drawn into the airbag and closes the vent holes in the non-discharge state.

5. The airbag device according to claim 1, further comprising:
a check valve at the gas passage of the partition wall, the check valve allowing the gas to flow from the first chamber to the second chamber and blocks a gas flow from the second chamber to the first chamber.

6. The airbag device according to claim 1, wherein
the discharge-state switching member is arranged at a lateral portion of the airbag in an inflated and deployed configuration.

7. The airbag device according to claim 1, wherein
the vent holes of the discharge state switching member reside at positions away from the opening in the airbag when the vent holes are in the non-discharge state.

8. The airbag device according to claim 1, wherein
the partition wall comprises a first base fabric piece,
the airbag comprises a second base fabric piece, and
the second chamber is defined by placing the first base fabric piece on the second base fabric piece, and bonding the first base fabric piece to the second base fabric piece so that the second chamber is positioned between the first base fabric piece and the second base fabric piece.

9. The airbag device according to claim 1, wherein
the second chamber is a head restraining portion for receiving and restraining a head entering the airbag that is inflating and deploying.

10. An airbag device comprising an airbag inflatable and deployable by gas and an inflator supplying the gas to the airbag, the improvement comprising:
a partition wall dividing the inside of the airbag into a first chamber on the inflator side and a second chamber on the occupant side and having a gas passage which enables the gas to flow between the first chamber and the second chamber;
first and second discharge-state switching members in the first chamber of the airbag, the discharge-state switching members having first and second vent holes for discharging the gas from the airbag respectively and capable of switching the first and second vent holes between a discharge state discharging the gas from the airbag and a non-discharge state not discharging the gas;
a first coupling member having one end coupled to the first discharge-state switching member and the other end coupled to the partition wall; and
a second coupling member having one end coupled to the second discharge-state switching member and the other end coupled to a lower position on the first chamber side in the airbag in an inflated and deployed configuration,
wherein when the inflator is activated and when the airbag inflates and deploys, the first and second coupling members cause the first and second discharge-state switching members to apply tension to close the vent holes respectively, and when the inflated and deployed airbag receives an entering occupant and deforms, the first coupling member is loosened and releases the tension to the discharge-state switching member to open the first vent hole, and when the inflating and deploying airbag receives the occupant, the first and/or second coupling member opens the first and/or second vent hole.

11. The airbag device according to claim 10, further comprising:
a second partition wall dividing the first chamber of the airbag in an inflated and deployed configuration to define a third chamber and having a gas passage which enables the flow between the first chamber and the third chamber, wherein
the other end of the second coupling member is coupled to the second partition wall.

12. The airbag device according to claim 10, wherein
the first and/or second discharge-state switching member has a pair of base fabric pieces having end portions that surround an opening in the airbag and other end portions that are bonded to each other and cover the opening, whereby openings on both sides between the end portions and the other end portions of the pair of base fabric pieces define the vent holes.

13. The airbag device according to claim 10, wherein
the first and second discharge-state switching members with the vent holes are individually drawn out of the airbag and open the vent holes in the discharge state and the first and second discharge-state switching members together with the vent holes are individually drawn into the airbag and close the vent holes in the non-discharge state.

14. The airbag device according to claim 10, wherein
the first and second discharge-state switching members are individually arranged in each of the lateral portions of the airbag in an inflated and deployed configuration.

15. The airbag device according to claim 10, further comprising:
a check valve provided to the gas passage of each partition wall, the check valve allowing the gas to flow from the first chamber to the second chamber or the third chamber and blocks a gas flow from the second chamber or the third chamber to the first chamber.

16. The airbag device according to claim 10, wherein
the vent holes of the first and/or second discharge state switching member reside at positions away from the opening in the airbag when the vent holes are in the non-discharge state.

17. An airbag device comprising an airbag inflatable and deployable by gas and an inflator supplying the gas to the airbag, the improvement comprising:
a partition wall dividing the inside of the airbag into a first chamber on the inflator side and a second chamber on the occupant side and having a gas passage which enables the gas to flow between the first chamber and the second chamber;
first and second panel members constituting side panels of the airbag, the first and second panel members including a junction for bonding the panel members to each other and base fabric pieces adjacent to the junction;
a discharge-state switching member which is formed by bonding the base fabric pieces each other, discharge-state switching member being arranged on the first chamber side when the panel members are bonded, and having vent holes communicating with an opening adjacent to the bonded portion between the panel members; and
a coupling member having one end coupled to the discharge-state switching member and the other end coupled to the partition wall, the coupling member defining the second chamber in the airbag for receiving an occupant entering the airbag that is inflating and deploying, wherein when the airbag inflates and deploys, the coupling member causes the discharge-state switching member to apply tension to close the vent holes, and when the inflated and deployed airbag receives an entering occupant and deforms, the coupling member is loosened and releases the tension to the discharge-state switching member to open the vent holes.

18. The airbag device according to claim 17, wherein the base fabric pieces are integrated with the first and second panel members, and are bonded to each other at the distal end portions thereof to define openings for the vent holes along the side edges thereof.

19. The airbag device according to claim 17, wherein the side panels are integrated with a center panel to constitute the airbag, and the other end of the coupling member is coupled to a portion on an occupant side of the center panel.

20. The airbag device according to claim 17, wherein the second chamber is positioned so as to receive an occupant not seated in a predetermined normal position.

* * * * *